(12) United States Patent
Matono et al.

(10) Patent No.: US 7,808,743 B2
(45) Date of Patent: Oct. 5, 2010

(54) PERPENDICULAR MAGNETIC WRITE HEAD HAVING A STRUCTURE THAT SUPPRESSES UNINTENDED ERASURE OF INFORMATION ON A WRITE MEDIUM AT A NON-WRITING TIME

(75) Inventors: Naoto Matono, Nagano (JP); Noriaki Kasahara, Tokyo (JP); Shin Narushima, Tokyo (JP); Takamitsu Sakamoto, Tokyo (JP); Koichi Otani, Tokyo (JP)

(73) Assignees: TDK Corporation, Tokyo (JP); Sae Magnetics (H.K.) Ltd., Hong Kong (CN)

( * ) Notice: Subject to any disclaimer, the term of this patent is extended or adjusted under 35 U.S.C. 154(b) by 726 days.

(21) Appl. No.: 11/713,740

(22) Filed: Mar. 5, 2007

(65) Prior Publication Data
US 2008/0253034 A1 Oct. 16, 2008

(51) Int. Cl.
*G11B 5/127* (2006.01)
(52) U.S. Cl. .............................. 360/125.3; 360/125.03; 360/125.15
(58) Field of Classification Search ............. 360/125.3, 360/125.15, 125.12, 125.03, 125.02, 125.01
See application file for complete search history.

(56) References Cited

U.S. PATENT DOCUMENTS

| | | | |
|---|---|---|---|
| 6,759,081 B2 | 7/2004 | Huganen et al. | |
| 7,463,450 B2 * | 12/2008 | Sasaki et al. | ............ 360/125.24 |
| 2005/0280938 A1 * | 12/2005 | Sasaki et al. | ................. 360/126 |
| 2006/0061907 A1 * | 3/2006 | Sasaki et al. | ................. 360/126 |
| 2006/0098335 A1 * | 5/2006 | Hirata et al. | ................. 360/125 |
| 2007/0139817 A1 * | 6/2007 | Hirata et al. | ................. 360/126 |
| 2008/0220157 A1 * | 9/2008 | Takenoiri et al. | ............ 427/131 |

FOREIGN PATENT DOCUMENTS

| | | |
|---|---|---|
| EP | 0 360 978 | 4/1990 |
| JP | A-61-192011 | 8/1986 |
| JP | A-02-066710 | 3/1990 |
| JP | A-07-014120 | 1/1995 |
| JP | A-07-307009 | 11/1995 |
| JP | A-2000-235911 | 8/2000 |
| JP | A-2000-331310 | 11/2000 |
| JP | A2001-250204 | 9/2001 |
| JP | A-2002-197615 | 7/2002 |
| JP | A-2006-155866 | 6/2006 |
| JP | A-2007-257815 | 10/2008 |

* cited by examiner

*Primary Examiner*—Julie Anne Watko
(74) *Attorney, Agent, or Firm*—Oliff & Berridge, PLC

(57) ABSTRACT

A perpendicular magnetic write head includes an auxiliary magnetic pole layer disposed on a trailing or leading side of a main magnetic pole layer, the auxiliary magnetic pole layer being recessed from the main magnetic pole layer. A nonmagnetic layer is disposed in a layer same as the auxiliary magnetic pole layer and in front of the auxiliary magnetic pole layer, the nonmagnetic layer having an internal stress of a direction same as that of the main magnetic pole layer, and a write shield layer is disposed in a layer same as the auxiliary magnetic pole layer and in front of the auxiliary magnetic pole layer, the write shield layer being separated from the main magnetic pole layer with a gap layer in between. The nonmagnetic layer is arranged to fill up a space between the auxiliary magnetic pole layer and the write shield layer.

12 Claims, 18 Drawing Sheets

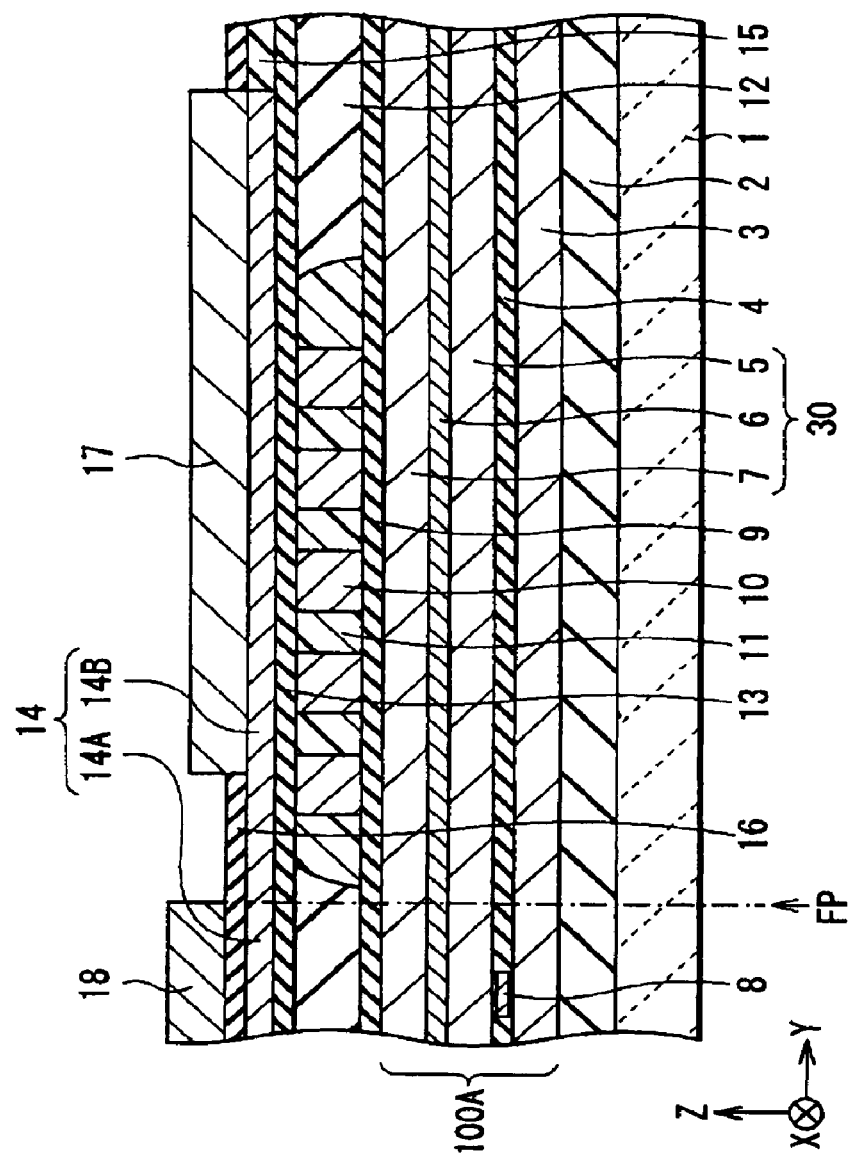
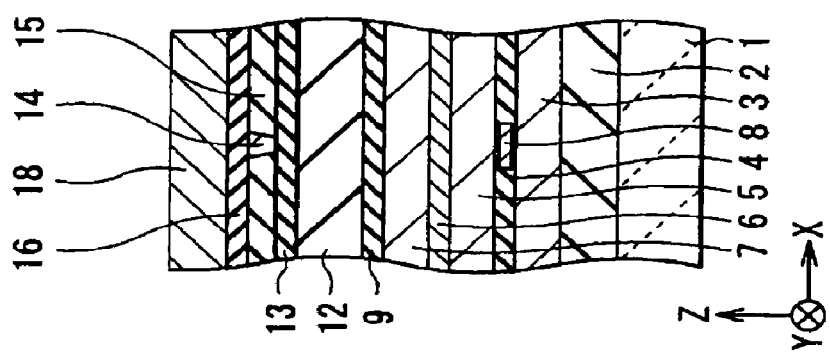

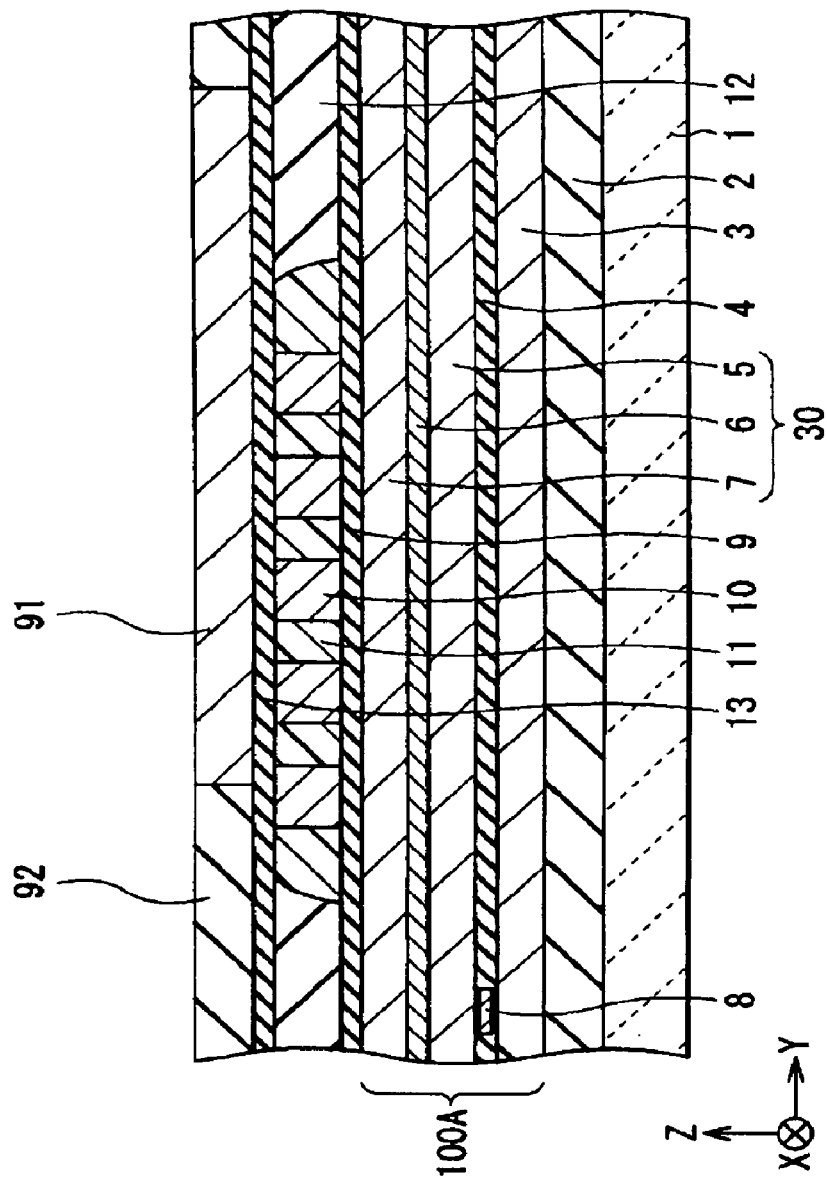
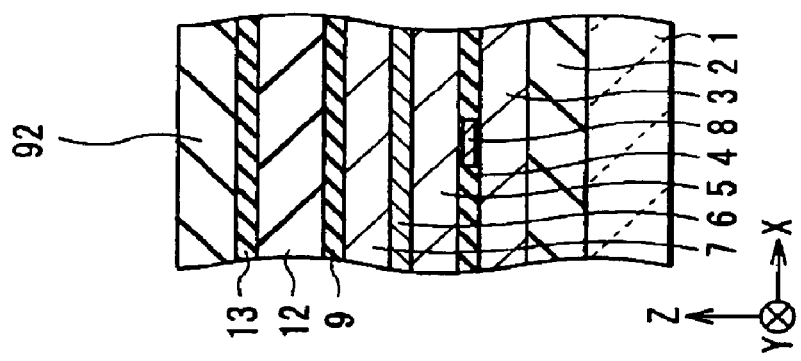
FIG. 14B
FIG. 14A

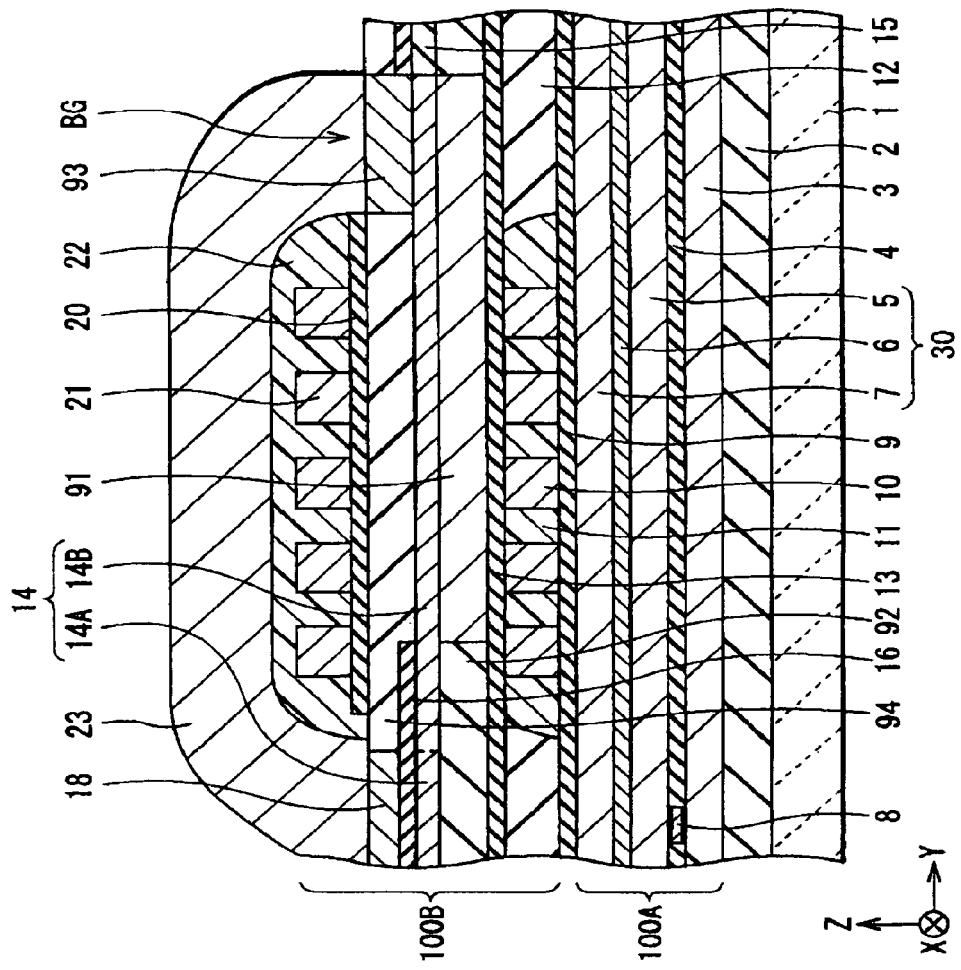
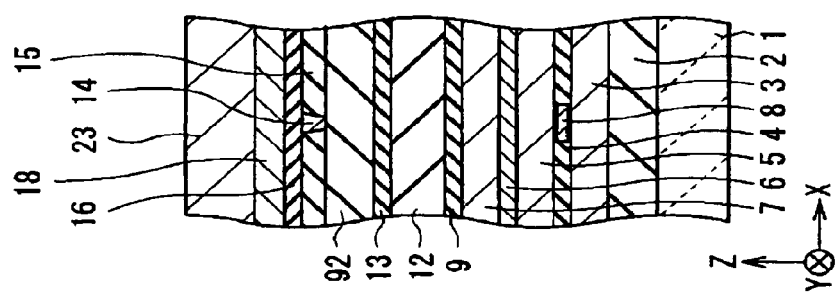
FIG. 17B
FIG. 17A

PERPENDICULAR MAGNETIC WRITE HEAD HAVING A STRUCTURE THAT SUPPRESSES UNINTENDED ERASURE OF INFORMATION ON A WRITE MEDIUM AT A NON-WRITING TIME

BACKGROUND OF THE INVENTION

1. Field of the Invention

The present invention relates to a perpendicular magnetic write head provided with an induction type magnetic transducer element for write, method of manufacturing the same, and a magnetic write system which carries the perpendicular magnetic write head.

2. Description of the Related Art

In recent years, improvement is required in performance of a thin film magnetic head, which is mounted on magnetic write systems such as a hard disk drive, associated with improvement in the surface writing density of a magnetic write medium such as a hard disk (hereinafter just called "write medium").

As examples of writing system of such thin film magnetic head, the longitudinal write system which sets a direction of signal magnetic field to an in-plane direction (longitudinal direction) of the write medium, and the perpendicular write system which sets up a direction of the signal magnetic field to a direction orthogonal to the plane of the write medium are known. Although the longitudinal write system is widely used nowadays, it is assumed that the perpendicular write system is more promising than the longitudinal write system in the future in consideration of the market trend, which is affected by improvement of the surface writing density of the write medium. It is because the perpendicular write system has advantages that high linear writing density is obtained and that an already-written write medium is hardly subject to heat fluctuation.

The thin film magnetic head of the perpendicular write system (hereinafter just called "perpendicular magnetic write head") is provided with a thin film coil which generates magnetic flux and a main magnetic pole layer which leads the magnetic flux generated in the thin film coil to the write medium.

As an example of such perpendicular magnetic write head, those in which the main magnetic pole layer extends in a direction orthogonal to an air bearing surface are known and such a head structure is generally called "single pole head." As for such single pole head, those in which an auxiliary magnetic pole layer for magnetic flux supply is put together with the main magnetic pole layer have been developed in order to increase intensity of the write magnetic field (perpendicular magnetic field) (reference to Unexamined Japanese Patent Publication No. H02-066710 and Japanese Patent Publication No. 2002-197615, for example). However, such single pole head is said to have a limitation in improving the writing density of the write medium.

As for a latest perpendicular magnetic write head, in view of the above, those provided with a write shield layer for taking in a spread component of magnetic flux emitted from the main magnetic pole layer are becoming mainstream so that the writing density can be more improved. This kind of head structure is generally called "shield type head." As for such shield type head, those in which the write shield layer is disposed on a trailing side of the main magnetic pole layer have been developed (for example, refer to Japanese Patent Publication No. 2001-250204 and European patent Publication No. 0360978.

Especially about the shield type head, in order to suppress unintended erasure of information written on the write medium at the time of writing, those in which the auxiliary magnetic pole layer is disposed on the trailing side of the main magnetic pole layer are also developed (for example, refer to Japanese Patent Publication No. 2006-155866).

By the way, demand for writing performance of the perpendicular magnetic write head is still more increasing day by day. Based on such circumstances, it has been examined recently, as an improvement measure, to optimize a magnetic domain structure of main component elements that are engaged in writing operation.

Specifically, a magnetic film, which is made of a magnetic layer containing a magnetic metal and a transition metal and an intermediate layer containing a magnetic metal and a transition metal similarly, with its composition optimized in order to obtain high frequency characteristics, strong uniaxial anisotropy, and high saturation magnetic flux density, is known (for example, refer to Japanese Patent Publication No. 2000-150233). As well, a magnetic material, which includes nickel (Ni), steel (Fe) and molybdenum (Mo), with its composition and magnetostriction constant optimized in order to acquire high frequency characteristics and a good magnetic domain structure, is known (for example, refer to Japanese Patent Publication No. 2000-235911).

Besides, other well-known examples include: a thin film magnetic head, which is provided with an upper magnetic pole whose plus and minus of the magnetostriction constant are reversed between an upper area and an lower area thereof in order to acquire uniaxial anisotropy in a desired direction (for example, refer to a Japanese Patent Publication No. H07-307009 and a Japanese Patent Publication No. 1986-192011); a thin film magnetic head, which is provided with a yoke containing two sets of magnetic layers respectively having a mutually different magnetostriction constant and disposed so as to be partially overlapped each other in order to suppress generating of noises caused by stress induced anisotropy effect (for example, refer to Japanese Patent Publication No. H07-014120); and a thin film magnetic head provided with a pole chip having a zero or negative magnetostriction constant and a head core rear having a zero or positive magnetostriction constant in order to suppress distortion of a read waveform (for example, refer to Japanese Patent Publication No. H02-252111).

In addition, another known example is a thin film magnetic head provided with a magnetic domain control soft magnetic layer for making a 180 degree magnetic wall in a core width direction appear in a magnetic domain structure of a yoke of a magnetic layer between a coil cover which covers a coil layer and the yoke in order to obtain a good magnetic domain structure, high frequency response characteristics, and a high transfer rate (refer to Japanese Patent Application No. 2000-331310).

It is to be noted that, in the recent manufacturing field of thin film magnetic heads, the ALD method is used as the formation method which is extremely excellent in thickness control characteristics (for example, refer to an "ALD atomic layer deposition apparatus", by Techscience Ltd., <URL: http://techsc.co.jp/products/mems/ALD.htm>). The ALD method is the step of forming an oxide film, a nitride film, or a metal film very thinly and precisely under high temperature conditions of 150 degrees C. or more, and is widely used in a manufacturing field in which physical characteristics such as dielectric strength voltage are severely required. In the manufacture field of the thin film magnetic head, the ALD method is used in the formation process of a read gap (for example, refer to the specification of U.S. Pat. No. 6,759,081).

SUMMARY OF THE INVENTION

However, in the perpendicular magnetic write head of the related art, a magnetic domain structure of main component elements such as a main magnetic pole layer, an auxiliary magnetic pole layer and a write shield layer that are engaged in writing operation, is hardly optimized even now. For this reason, there is a problem that information written on the write medium may be erased without intention when magnetic flux, which remains in the main magnetic pole layer, is leaked out at a non-writing time. In view of the drawback of the invention, it is desirable to provide a perpendicular magnetic write head, method of manufacturing the same, and a magnetic write system in which unintended erasure of information written on a write medium can be suppressed at a non-writing time by optimizing the magnetic domain structure of the main component elements that are engaged in writing operation.

A perpendicular magnetic write head according to the present invention includes: a main magnetic pole layer leading a magnetic flux to a write medium, the main pole layer having an internal stress of a specified direction; an auxiliary magnetic pole layer disposed on a trailing side or leading side of the main magnetic pole layer, the auxiliary magnetic pole layer being recessed from the main magnetic pole layer; and a nonmagnetic layer disposed in a layer same as the auxiliary magnetic pole layer and in front of the auxiliary magnetic pole layer, the nonmagnetic pole layer having an internal stress of a direction same as that of the main magnetic pole layer.

A magnetic write system of the present invention includes a write medium and a perpendicular magnetic write head, wherein the perpendicular magnetic write head includes: a main magnetic pole layer leading magnetic flux to the write medium, the main magnetic pole layer having an internal stress of a specified direction; an auxiliary magnetic pole layer disposed on a trailing side or leading side of the main magnetic pole layer, the auxiliary magnetic pole layer being recessed from the main magnetic pole layer; and a nonmagnetic layer disposed in a layer same as the auxiliary magnetic pole layer and in front of the auxiliary magnetic pole layer, the nonmagnetic layer having an internal stress of a direction same as that of the main magnetic pole layer.

A method of manufacturing a perpendicular magnetic write head of the present invention includes the steps of: forming a main magnetic pole layer which leads magnetic flux to a write medium so as to have an internal stress of a specified direction; forming an auxiliary magnetic pole layer on a trailing side or leading side of the main magnetic pole layer so as to be recessed from the main magnetic pole layer; and forming a nonmagnetic layer in a layer same as the auxiliary magnetic pole layer and in front of the auxiliary magnetic pole layer so as to have an internal stress of the same direction as that of the main magnetic pole layer.

In the perpendicular magnetic write head, method of manufacturing the same, or the magnetic write system of the present invention, the auxiliary magnetic pole layer is disposed on the trailing or leading side of the main magnetic pole layer so as to be recessed from the main magnetic pole layer, and when the main magnetic pole layer has a specified internal stress, the nonmagnetic layer disposed in a layer same as the auxiliary magnetic pole layer and in front of the auxiliary magnetic pole layer, the nonmagnetic layer having an internal stress of the same direction as that of the main magnetic pole layer. Therefore, the magnetic domain structures of the main magnetic pole layer and the auxiliary magnetic pole layer are kept in a good state of the initial formation without being influenced by the internal stress of the nonmagnetic layer. With this arrangement, magnetic flux which remains in the main magnetic pole layer and the auxiliary magnetic pole layer is hardly leaked out immediately after information-writing due to the magnetoelasticity effect. Accordingly, unintended erasure of information written on a write medium can be suppressed at a non-writing time, by optimizing the magnetic domain structures of the main component elements that are engaged in writing operation.

Other objects, features and effects of the present invention will be explained as necessary in the following descriptions.

BRIEF DESCRIPTION OF THE DRAWINGS

FIGS. 5A and 5B are sectional views for explaining one production process in a manufacturing process of the thin film magnetic head according to the first embodiment of the present invention.

FIGS. 14A and 14B are sectional views for explaining a step subsequent to that of FIGS. 13A, 13B.

FIGS. 17A and 17B are sectional views for explaining a step subsequent to that of FIGS. 16A and 16B.

DESCRIPTION OF THE PREFERRED EMBODIMENTS

Embodiments of the present invention will be described in detail hereinbelow with reference to the drawings.

First Embodiment

Figure 1B:
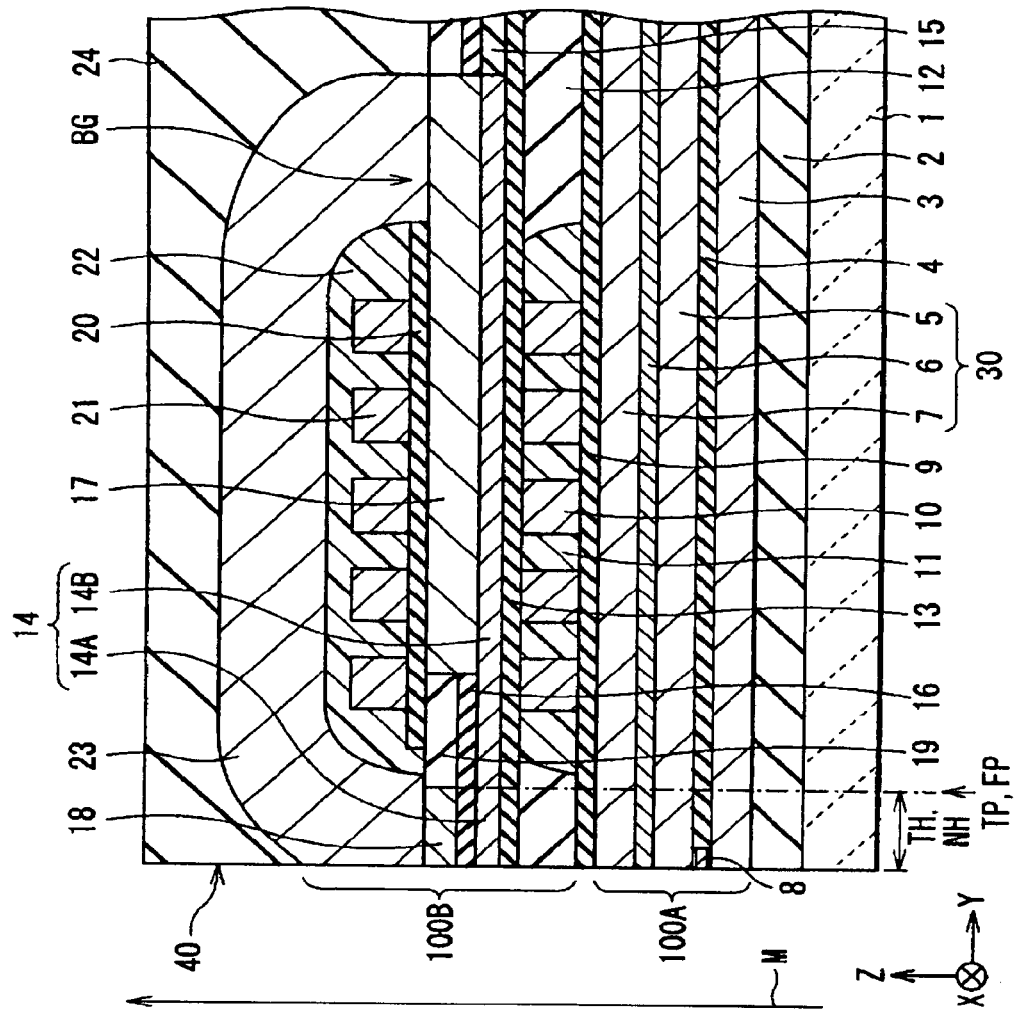
FIGS. 1A and 1B are cross-sectional views showing a sectional configuration of a thin film magnetic head according to a first embodiment of the present invention.
Figure 1A:
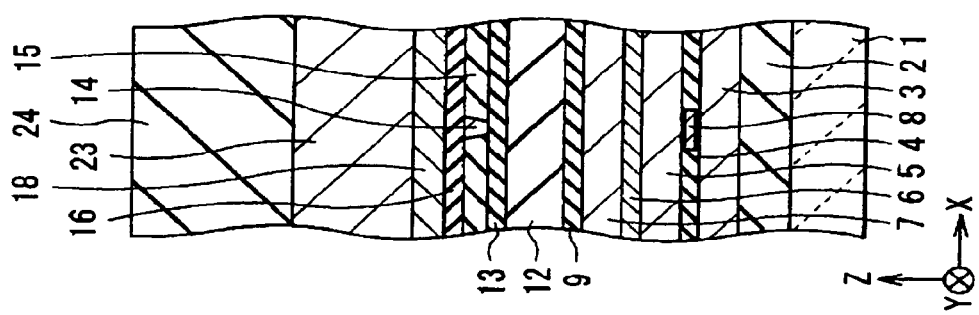
Figure 2:
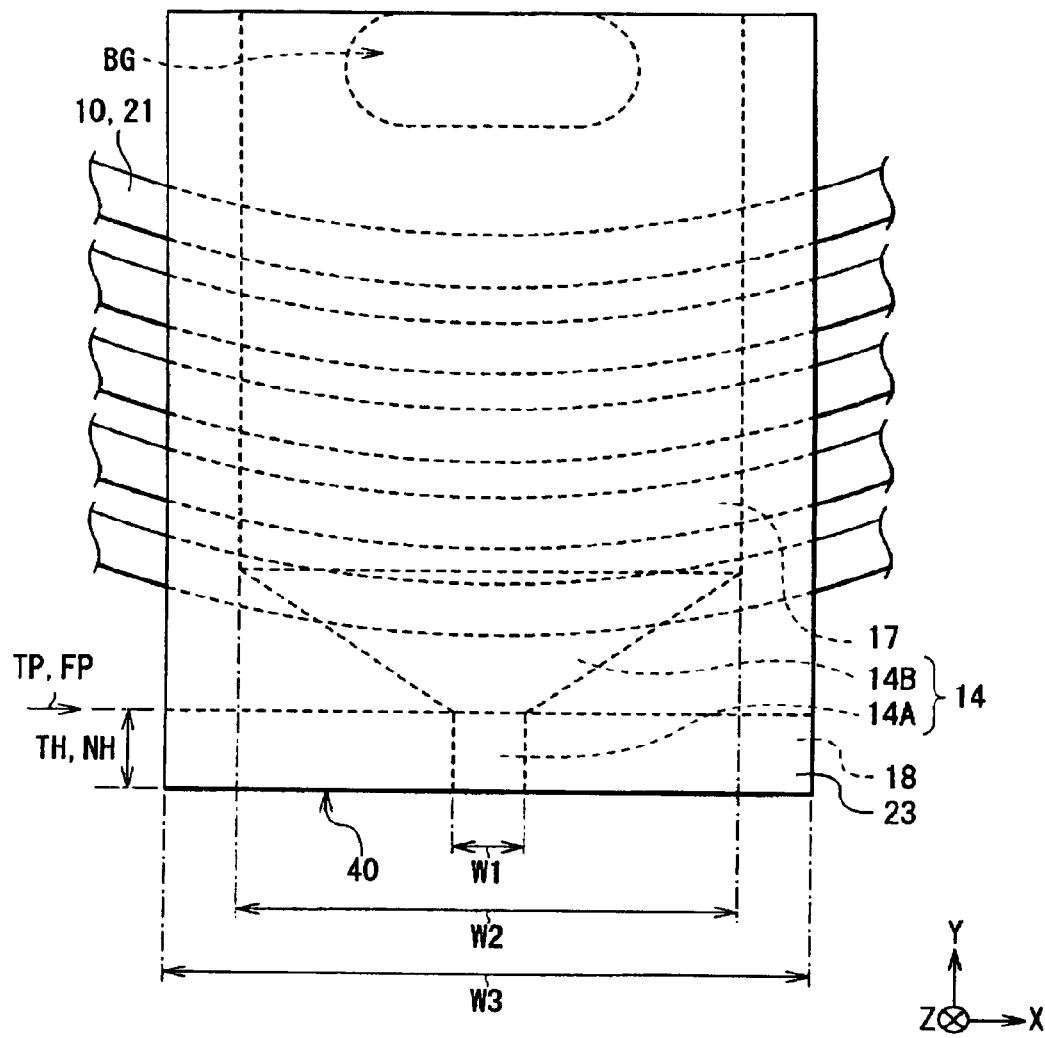
FIG. 2 is a plan view illustrating a configuration of the thin film magnetic head shown in FIGS. 1A and 1B.
Figure 3:
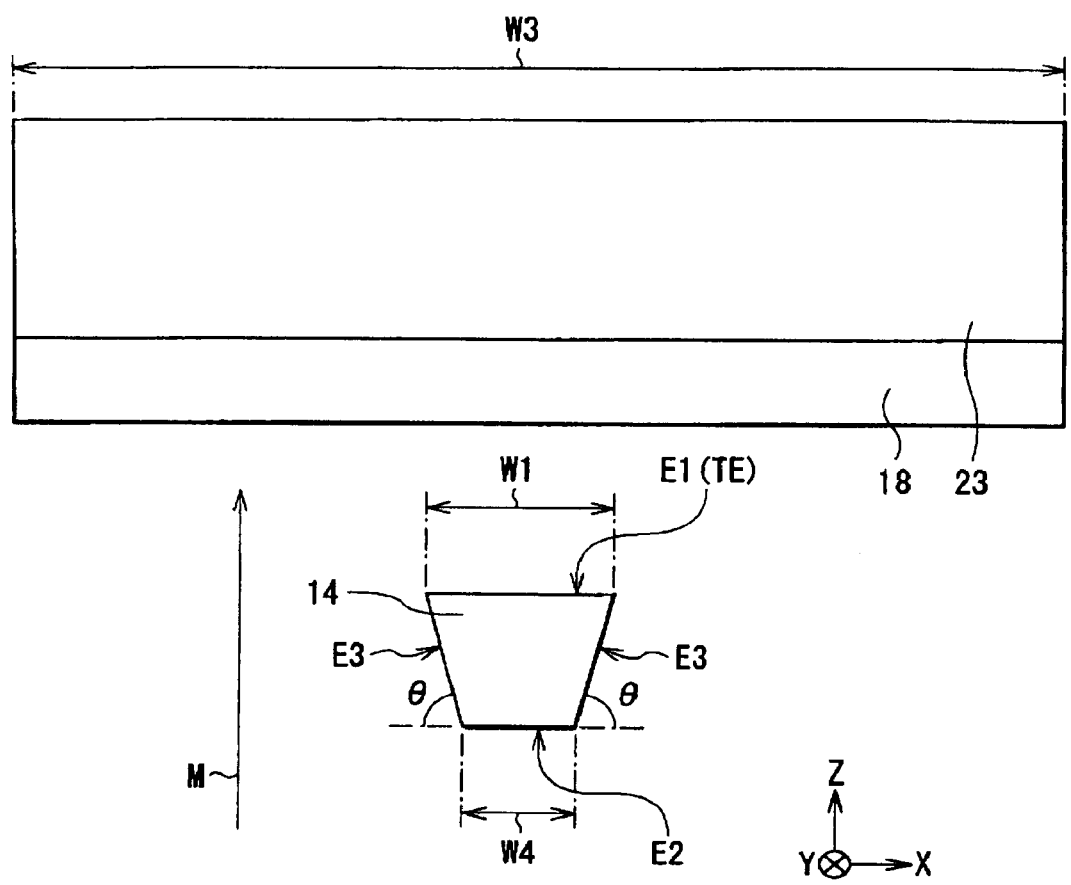
FIG. 3 is a plan view illustrating a configuration of a principal portion of the thin film magnetic head shown in FIGS. 1A, 1B.
Figure 4:
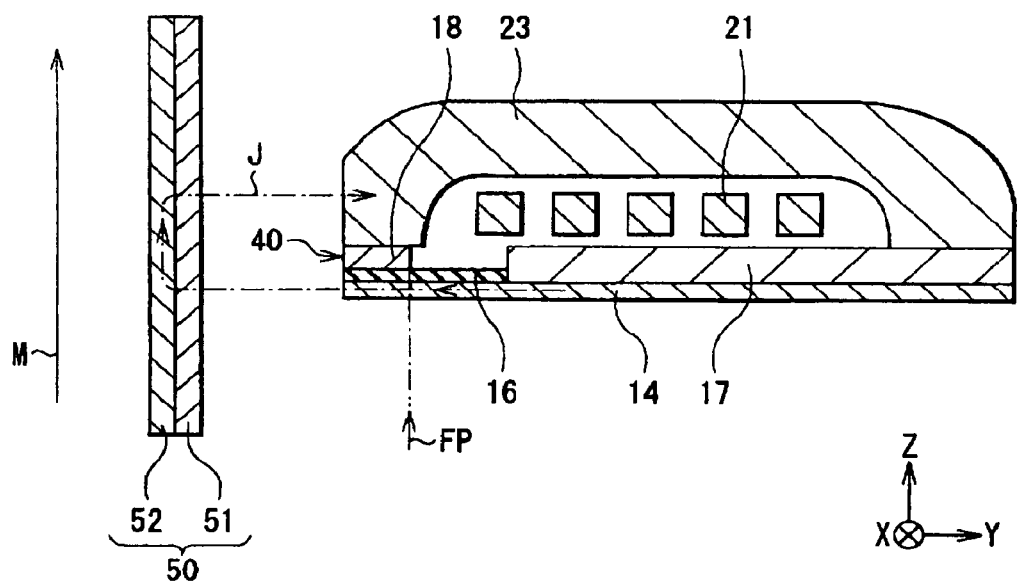
FIG. 4 is a sectional view showing a configuration of the principal portion of the thin film magnetic head shown in FIGS. 1A, 1B.

First, a configuration of a thin film magnetic head according to a first embodiment of the present invention will be described. FIGS. 1A, 1B to FIG. 4 show a configuration of a thin film magnetic head, and FIGS. 1A, 1B show a cross-sectional configuration thereof, FIG. 2 shows a plan view configuration thereof, FIG. 3 shows a plan view configuration of its principal portion, and FIG. 4 shows a cross-sectional configuration of the principal portion respectively. In addition, FIG. 1A shows a cross section parallel to an air bearing surface 40, and FIG. 1B shows a cross section perpendicular to the air bearing surface 40, respectively. FIG. 4 also shows a write medium 50 together with the thin film magnetic head, and an upward arrow M shown in FIGS. 1A, 1B, FIG. 3, and FIG. 4 respectively express a direction (medium movement direction M) in which the write medium 50 moves relatively to the thin film magnetic head.

In the following descriptions, dimension in the X-axis direction is designated as "width", dimension in the Y-axis direction is designated as "length", and dimension in the Z-axis direction is designated as "thickness" respectively as shown in FIGS. 1A, 1B to FIG. 4. Besides, the side close to the air bearing surface 40 of the Y-axis direction is designated as "forward", and the side opposite to that is designated as "backward" respectively. These designations are used in the same way even in and after FIGS. 5A, 5B that will be described later.

The thin film magnetic head of the present embodiment executes a magnetic process to the write medium 50 (a hard disk, for example) shown in FIG. 4, which is a combined magnetic write and read head that can execute both of magnetic write processing and read processing. As shown in FIGS. 1A, 1B, for example, the thin film magnetic head is formed in such a manner that a substrate 1, an insulating layer 2, a read head section 100A which executes a read processing using MR (magneto-resistive) effect, a separation layer 9, a write head section 100B which executes a write processing of a perpendicular write system, and an overcoat layer 24 are layered in this order. The substrate 1 is made of ceramic materials, such as altic ($Al_2O_3$ and TiC), and the insulating layer 2, the separation layer 9, and the overcoat layer 24 is made of nonmagnetic insulation materials, such as an aluminum oxide ($AlO_x$: ex. alumina ($Al_2O_3$)).

The read head section 100A is formed in such a manner that a lower read shield layer 3, a shield gap layer 4, and an upper read shield layer 30 are stacked in this order, for example. A read element (an MR element 8) is embedded in the shield gap layer 4 in such a manner as being exposed outside on the air bearing surface 40.

The lower read shield layer 3 and the upper read shield layer 30 extend from the air bearing surface 40 to backward, and are made of magnetic materials, such as a nickel iron alloy (NiFe: hereinafter just called "permalloy (tradename)). Composition of this permalloy is nickel=80 wt % and Fe=20 wt %, for example. The upper read shield layer 30 is formed in such a manner that two upper read shield layer portions 5 and 7 are layered with a nonmagnetic layer 6 in between, for example. The upper read shield layer portions 5 and 7 are made of magnetic materials such as a permalloy for example, and the nonmagnetic layer 6 is made of nonmagnetic substances such as ruthenium (Ru) or alumina, for example. It is to be noted that the upper read shield layer 30 does not necessarily need to have a layered structure, and may have a monolayer structure made of a magnetic material.

The shield gap layer 4 is made of nonmagnetic insulation materials such as alumina, for example. This MR element 8 works using Giant Magneto-Resistive effect (GMR) or tunneling magneto-resistive effect (TMR) or the like, for example.

The write head section 100B is a perpendicular magnetic write head in which a first thin film coil 10 buried in an insulating layers 11 to 13, a main magnetic pole layer 14 buried and surrounded by a nonmagnetic layer 15, a gap layer 16, an auxiliary magnetic pole layer 17 buried and surrounded by a nonmagnetic layer 19, a write shield layer 18, a second thin film coil 21 buried in insulating layers 20 and 22 and a return yoke layer 23 are layered in this order for example, which is what is called a shield type head. The thin film coil 10 generates a magnetic flux for controlling leakage in order to suppress leakage of the write magnetic flux that is generated in the thin film coil 21 (that is, the write magnetic flux affects the read head section 100A without intention). The thin film coil 10, which is made of high conductivity materials such as copper (Cu) for example, has a spiral structure in which the thin film coil 10 is winding around a back gap BG as shown in FIGS. 1A, 1B, and 2. Although the number of winding (turn number) of the thin film coil 10 can be set up arbitrarily, the turn number thereof is preferably in agreement with that of the thin film coil 21.

The insulating layer 11, which is made of nonmagnetic insulation materials such as photoresist and spin on glass (SOG) showing fluidity when heated, is disposed between and around each winding of the thin film coil 10 for example. The insulating layer 12 is disposed in the circumference of the insulating layer 11, and the insulating layer 13 is disposed so as to cover the thin film coil 10 and the insulating layers 11, 12. These are made of nonmagnetic insulation materials such as alumina, for example. The thickness of the insulating layer 13 is about 0.05 µm to 0.2 µm. The main magnetic pole layer 14, which leads the magnetic flux generated in the thin film coil 21 to the write medium 50, extends from the air bearing surface 40 to backward. The main magnetic pole layer 14 is made of magnetic materials such as an iron cobalt-based alloy, for example, and the thickness thereof is about 0.15 µm to 0.4 µm. Examples of the above-mentioned iron cobalt-based alloy include an iron cobalt alloy (FeCo) or a cobalt iron nickel alloy (CoFeNi).

The main magnetic pole layer 14, which is an abbreviated battledore configuration in plan view as a whole, includes, for example, a tip portion 14A with a fixed width W1 for specifying a width of a writing track, a rear end portion 14B which is magnetically connected at the rear of the tip portion 14A with a width W2 bigger than the width W1 in this order from the air bearing surface 40, as shown in FIG. 2. The width of the rear end portion 14B is uniformed (W2) in the backward area while it becomes gradually narrower toward the tip portion 14A in the forward area, for example. The position where the width of the main magnetic pole layer 14 begins to spread from W1 to W2 is a flare point FP, and distance between the air bearing surface 40 and the flare point FP is a neck height NH.

An end face of the main magnetic pole layer 14 on the air bearing surface 40 is of an inverted trapezoid in shape whose long arm located on a trailing side is an upper base and whose short arm located on a leading side is a lower base respectively, for example, as shown in FIG. 3. More specifically, configuration of the end face of the main magnetic pole layer 14 is defined by an upper end edge E1 (width W1) located on the trailing side, a lower end edge E2 (width W4) located on the leading side, and two side edges E3. The width W4 is smaller than the width W1. The upper end edge E1 is a substantial writing section (what is called trailing edge TE) of the main magnetic pole layer 14, and the width W1 is about 0.2 μm or less. Bevel angle θ, that is, an angle between an extending direction of the lower end edge E2 and the side edges E3 can be arbitrarily determined within a range below 90 degrees.

It is to be noted that, when the movement state of the write medium 50 which goes in the medium movement direction M is regarded as one flow, the "trailing side" means a side where the flow goes to (a forward side in the medium movement direction M), which means the upper side of the thickness direction (Z-axis direction) here. On the other hand, the side where the flow comes in is called the "leading side" (the rear side of the medium movement direction M), which means the lower side of the thickness direction here.

Especially, the main magnetic pole layer 14 has an internal stress of a specified direction. This internal stress is a stress that remains inside after the formation of the main magnetic pole layer 14 to affect a magnetic domain structure thereof, which is specifically a tensile stress or compressive stress. Here, the main magnetic pole layer 14 has a tensile stress as its internal stress, for example.

The tensile stress is a stress applied in a pulling direction on the basis of the inside of the main magnetic pole layer 14 (that is, a direction which goes outside of the main magnetic pole layer 14). On the other hand, a stress applied in a compressing direction (that is, a direction which goes inside the main magnetic pole layer 14) on the same basis is the compressive stress.

The nonmagnetic layer 15 is made of nonmagnetic insulation materials such as alumina, for example. This nonmagnetic layer 15 is made flat with the main magnetic pole layer 14, for example, and thickness thereof is the same with that of the main magnetic pole layer 14. The gap layer 16, which extends from the air bearing surface 40 up to the front end of the auxiliary magnetic pole layer while adjoining the main magnetic pole layer 14, is made of nonmagnetic insulation materials such as alumina, for example. As for the gap layer 16, a portion put between the main magnetic pole layer 14 and the write shield layer 18 is a magnetic gap for separating both of them, with its thickness about 0.03 μm to 0.1 μm.

The auxiliary magnetic pole layer 17, which supplies magnetic flux to the main magnetic pole layer 14, extends from a retreating position rather than the air bearing surface 40 to the backward direction. This auxiliary magnetic pole layer 17 is made of magnetic materials such as a permalloy or an ironcobalt based alloy for example, and is a rectangle in shape in plan view with a width W2, as shown in FIG. 2. In addition, the auxiliary magnetic pole layer 17 is formed thicker than the main magnetic pole layer 14, with a thickness of about 0.5 μm to 1 m in order to earn an enough magnetic flux capacity (namely, what is called magnetic volume).

Especially, the auxiliary magnetic pole layer 17 is disposed on the trailing side or leading side of the main magnetic pole layer 14 and is magnetically connected with the main magnetic pole layer 14. Here, the auxiliary magnetic pole layer 17 is disposed on the trailing side of the main magnetic pole layer 14, for example. The structure where the auxiliary magnetic pole layer 17 is disposed on the trailing side is called top yoke structure.

The write shield layer 18 takes in spread components of the magnetic flux to be led to the write medium 50 emitted from the main magnetic pole layer 14 so as to (1) increase magnetic field gradient of a perpendicular magnetic field, (2) to narrow a write width, and (3) to include an oblique magnetic field component in the perpendicular magnetic fields. The write shield layer 18, which is disposed in an area in front of the auxiliary magnetic pole layer 17 in a layer same as that, and extends from the air bearing surface 40 to a front position of the auxiliary magnetic pole layer 17, while separated from the main magnetic pole layer 14 by the gap layer 16. In addition, the write shield layer 18 is made of magnetic materials such as permalloy or iron-cobalt based alloy for example, and is a rectangle in shape in plan view with a bigger width W3 than the width W2 of the auxiliary magnetic pole layer 17, as shown in FIG. 2. A nonmagnetic layer 19, which specifies a throat height zero position TP, adjoins the back end of the write shield layer 18. Namely, the write shield layer 18 has a function of substantially specifying the throat height zero position TP in that back end.

The nonmagnetic layer 19 specifies the throat height zero position TP at the front edge thereof, and a distance between the air bearing surface 40 and the throat height zero position TP is a throat height TH. It is to be noted that FIGS. 1A, 1B, and FIG. 2 show a case where the throat height zero position TP is in agreement with the flare point FP, for example. The nonmagnetic layer 19 is disposed in an area in front of the auxiliary magnetic pole layer 17 in a layer same as that, and fills up a space between the auxiliary magnetic pole layer 17 and the write shield layer 18. Here, the nonmagnetic layer 19 is disposed so as to fill not only the area in front of the auxiliary magnetic pole layer 17 in a layer same as the layer, for example, but also bury the periphery of the auxiliary magnetic pole layer 17. The nonmagnetic layer 19 is made of nonmagnetic insulation materials such as an aluminum oxide (for example, alumina) or aluminum nitride, and nonmagnetic conductive materials such as ruthenium, for example.

Especially, the nonmagnetic layer 19 has an internal stress of a direction same as the internal stress of the main magnetic pole layer 14 in order to optimize the magnetic domain structure of the main magnetic pole layer 14. Here, the nonmagnetic layer 19 has a tensile stress as with the main magnetic pole layer 14, for example. The nonmagnetic layer 19 is formed by a manufacturing method, which is capable of producing the tensile stress when the above-mentioned nonmagnetic insulation materials and the nonmagnetic conductive materials are used, for example, by the ALD method.

In a case where both of the nonmagnetic layer 19 and the gap layer 16 are made of alumina, the nonmagnetic layer 19, which is formed by the ALD method, is composed differently from the gap layer 16 formed by a method other than the ALD method (by sputtering for example) even though they are made of the same material. Namely, since the gap layer 16 is formed by way of sputtering or the like, which uses an inert gas, it naturally contains the inert gas therein. Examples of such inert gas are argon (Ar), krypton (Kr), or xenon (Xe). On the other hand, the nonmagnetic layer 19 does not contain any inert gas because it is formed by such method as ALD, which does not use inert gas. Incidentally, whether or not the nonmagnetic layer 19 and the gap layer 16 include any inert gas can be specified using such component-analysis systems as scanning transmission electron microscopy (STEM), energy dispersive X-ray spectroscopy (EDS) and so on.

Besides, the nonmagnetic layer 19 and the gap layer 16 has a difference in the amount of a specific component contained therein because of the mutual differences in the above-mentioned formation method. Namely, the ALD method uses water and trimethyl aluminum (TMA), while the sputtering method does not use water and the like. As a result, the nonmagnetic layer 19 contains more hydrogen (H) than the gap layer 16.

The foregoing difference in the composition and hydrogen content of the nonmagnetic layer 19 is applicable not only to the gap layer 16 but also to the insulating layers 12 and 13, the nonmagnetic layer 15, the overcoat layer 24, etc. which may be made of the same nonmagnetic insulation materials as of the gap 16.

The thin film coil 21 generates write magnetic flux. Currents flow in the thin film coil 21 in a direction opposite to that of the thin film coil 10, for example. Other configuration of the thin film coil 21 is the same as that of thin film coil 10 except the above-described matter, for example.

The insulating layer 20 is a base of the thin film coil 21, which is made of the same nonmagnetic insulation material as the insulating layer 12 for example. The insulating layer 22 covers the insulating layer 20 together with the thin film coil 21, which is made of the same nonmagnetic insulation material as the insulating layer 11 for example. These are disposed in such a manner that the back gap BG are not covered, and they are connected with the nonmagnetic layer 19. The front edge of the insulating layer 22 is being recessed from the front edge of the nonmagnetic layer 19, for example.

The return yoke layer 23, which extends from the air bearing surface 40 to backward, has a function of circulating the magnetic flux between the thin film magnetic head and the write medium 50 by collecting the written magnetic flux (magnetic flux used for write processing in the write medium 50) and resupplying it to the main magnetic pole layer 14 and the auxiliary magnetic pole layer 17. The return yoke layer 23 is magnetically connected with the write shield layer 18 on a side close to the air bearing surface 40, for example, while it is magnetically connected with the auxiliary magnetic pole layer 17 on a side far from the air bearing surface 40. In addition, the return yoke layer 23 is made of the same magnetic material as the write shield layer 18, for example, and is of a rectangle configuration in plan view with a width W3 as shown in FIG. 2. The end faces of the write shield layer 18 and the return yoke layer 23 are of a rectangle configuration, for example, as shown in FIG. 3.

It is to be noted that the write medium 50 includes a magnetization layer 51 and a soft magnetic layer 52 in order from the side close to the thin film magnetic head, for example, as shown in FIG. 4. The magnetization layer 51 works to write information magnetically, and the soft magnetic layer 52 functions as a passage of the magnetic flux (what is called flux pass) in the write medium 50. Such kind of medium structure is called double layer perpendicular magnetic medium. It is needless to say that the write medium 50 may include other layers than the above-mentioned magnetization layer 51 and the soft magnetic layer 52.

The thin film magnetic head is operated as follows.

Namely, when a current flows into the thin film coil 21 of the write head section 100B from a not-illustrated external circuit at the time of information writing, a write magnetic flux J is generated. The magnetic flux J, after accommodated in the main magnetic pole layer 14 and the auxiliary magnetic pole layer 17, flows through the inside of the main magnetic pole layer 14 to the tip portion 14A. At that time, the magnetic flux J converges by being narrowed down at the flare point FP, thereby being concentrated around the trailing edge TE. The magnetic flux J is emitted outside to generate a perpendicular magnetic field, and then the magnetization layer 51 is magnetized by the generated perpendicular magnetic field. As a result, information is magnetically written on the write medium 50.

In this case, since currents flows into the thin film coils 10 and 21 in a mutually opposite direction, magnetic flux of a mutually opposite direction is generated respectively. Specifically, an upward magnetic flux is generated in the thin film coil 10 for controlling leakage, while a downward write magnetic flux is generated in the thin film coil 21. In response to the influence of the magnetic flux for leakage control, accordingly, the write magnetic flux hardly flows from the write head section 100B into the read head section 100A. Therefore leakage of the write magnetic flux is suppressed. As a result, deterioration of detecting accuracy of the MR element 8 caused by the influence of the write magnetic flux can be suppressed, and further, unintended erasure of information written on the write medium 50, which is due to a generation of unnecessary magnetic field caused by taking in the write magnetic flux into the lower read shield layer 3 and the upper read shield layer 30, can be suppressed.

In addition, when the magnetic flux J is emitted from the tip portion 14A, spread components of the magnetic flux J is taken into the write shield layer 18 to suppress the spread of the perpendicular magnetic field. The magnetic flux J taken into the write shield layer 18 is resupplied to the main magnetic pole layer 14 and the auxiliary magnetic pole layer 17 via the return yoke layer 23.

The magnetic flux J emitted from the main magnetic pole layer 14 toward the write medium 50 is collected by the return yoke 23 via the soft magnetic layer 52 after magnetizing the magnetization layer 51. In this case, a part of the magnetic flux J is collected also by the write shield layer 18. The magnetic flux J collected by those is resupplied to the main magnetic pole layer 14 and the auxiliary magnetic pole layer 17. Accordingly, since the magnetic flux J circulates between the write head section 100B and the write medium 50, a magnetic circuit is built.

On the other hand, when a sense current flows into the MR element 8 of the read head section 100A at the time of information reading, resistance of the MR element 8 changes in accordance with the read signal magnetic field from the write medium 50. The information written on the write medium 50 is read magnetically by detecting this resistance change as a voltage change.

Next, a method of manufacturing the above-described thin film magnetic head will be explained with reference to FIGS. 1A and 1B to FIG. 8. FIGS. 5A and 5B to FIGS. 8A and 8B illustrate a manufacturing process of the thin film magnetic head, showing cross-sectional configurations corresponding to FIGS. 1A and 1B respectively. Hereinbelow, first, a manufacturing process of the whole thin film magnetic head is schematically explained, then a formation process of the principal portions of the write head section 100B is explained in detail. Since configuration of the series of component elements, which constitute the thin film magnetic head, has already been explained in detail, the description thereof will be omitted as needed. The thin film magnetic head is manufactured by forming and layering the series of component elements successively with an existing thin film process, mainly using a film formation technique represented by electroplating methods or sputtering, a patterning technique represented by photo lithography methods, an etching technique represented by dry etching methods or wet etching methods, and a planarization technique represented by polishing methods and so on. Namely, as shown in FIGS. 1A and 1B, after forming the insulating layer 2 on the substrate 1 first, the read head section 100A is formed by layering on the insulating layer 2 the lower read shield layer 3, the shield gap layer 4 in which the MR element 8 is buried, and the upper read shield layer 30 (the upper read shield layer portions 5 and 7, and the nonmagnetic layer 6) in this order. Subsequently, after forming the separation layer 9 on the read head section 10A, the write head section 100B is formed by layering on the separation layer 9 the thin film coil 10 buried in the insulating layers 11 to 13, the main magnetic pole layer 14 with its periphery buried by the nonmagnetic layer 15, the gap layer 16, the auxiliary magnetic pole layer 17 with its periphery buried by the nonmagnetic layer 19, the write shield layer 18, the thin film coil 21 buried within the insulating layers 20 and 22, and the return yoke layer 23 in this order. Finally, after forming the overcoat layer 24 on the write head section 100B, the air bearing surface 40 is formed using machining or polish processing, thereby completing the formation of the thin film magnetic head.

Formation of the principal portion of the write head section 100B is carried out in such a manner that, after forming the insulating layer 13, as shown in FIGS. 5A and 5B, the main magnetic pole layer 14 is first formed on the insulating layer 13 by frame electroplating, for example. In this case, the main magnetic pole layer 14 is made to have a specified internal stress (for example, tensile stress). An example of detailed fabrication procedures of the main magnetic pole layer 14 by frame electroplating is as follows. Namely, first, a seed layer as an electrode film is formed on the insulating layer 13 using sputtering for example. Subsequently, after applying photoresist to the face of the insulating layer 13 to form a photoresist film thereon, a photoresist pattern is formed as a frame for plating by patterning the photoresist film using a photo lithography method (exposure and development). Subsequently, the main magnetic pole layer 14 is formed by growing up a plating film selectively on the seed layer using the photoresist pattern. Finally, after removing the photoresist pattern, an unnecessary portion of the seed layer is removed selectively using ion milling etc.

Subsequently, the nonmagnetic layer 15 is buried on the periphery of the main magnetic pole layer 14. Details of the burial procedure will be mentioned later exemplified by a case of the nonmagnetic layer 19. Subsequently, the gap layer 16 is formed on the main magnetic pole layer 14 and the nonmagnetic layer 15 by sputtering for example. In this case, a portion other than the area in which the auxiliary magnetic pole layer 17 is to be formed by a post-production process is covered by the gap layer 16, therefore the main magnetic pole layer 14 is partially exposed. Subsequently, the auxiliary magnetic pole layer 17 is formed on the exposure of the main magnetic pole layer 14 by frame electroplating for example, and also the write shield layer 18 is formed on the gap layer 16. In this case, the auxiliary magnetic pole layer 17 and the write shield layer 18 may be formed in the same production process, or they may be formed in a production process.

Figure 6B:
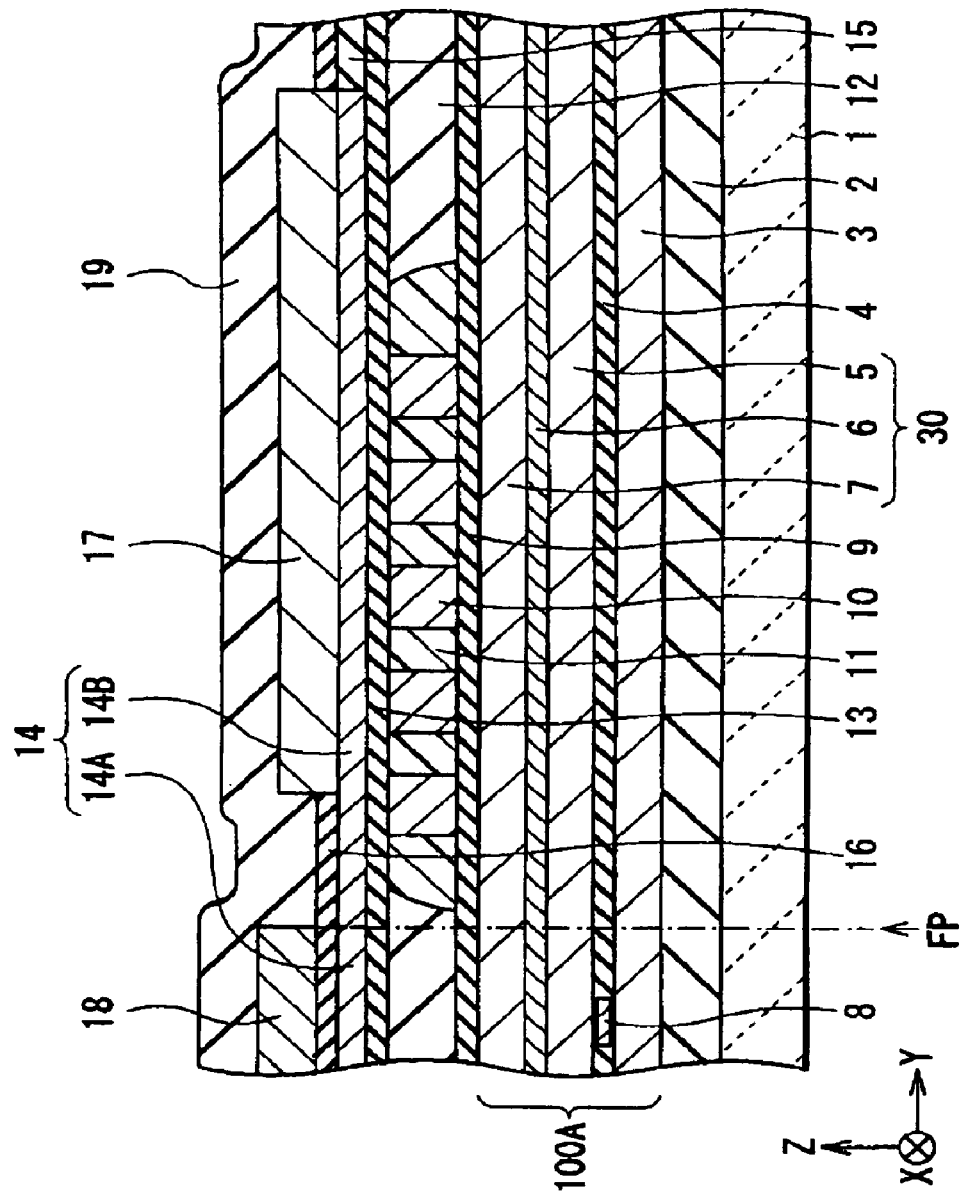
FIGS. 6A and 6B are sectional views for explaining a step subsequent to that of FIGS. 5A and 5B.
Figure 6A:
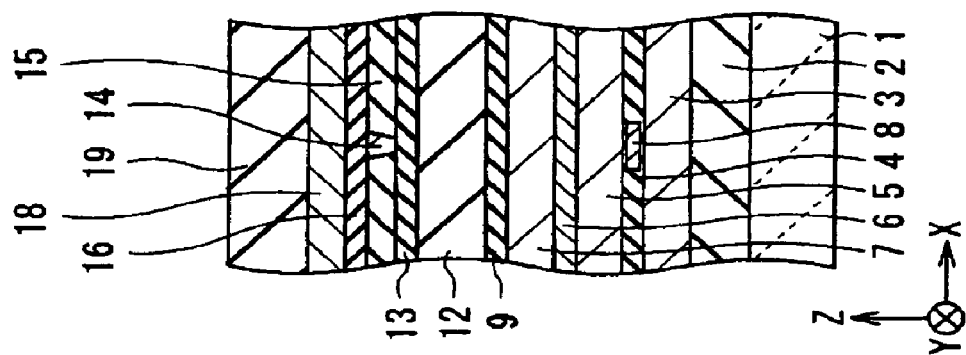

Subsequently, the nonmagnetic layer 19 is formed so as to cover the gap layer 16, the auxiliary magnetic pole layer 17 and the write shield layer 18 by the ALD method for example, as shown in FIGS. 6A, 6B. In this case, the nonmagnetic layer 19 is to be embedded between the auxiliary magnetic pole layer 17 and the write shield layer 18 at least, and also, the nonmagnetic layer 19 is made to have the internal stress in a direction same as that of the main magnetic pole layer 14 (for example, tensile stress). It is to be noted that the substrate temperature of the ALD method is the same as that of the ordinary substrate temperature, specifically about 150 degrees C. or more, and preferably about 200 degrees C.

Figure 7B:
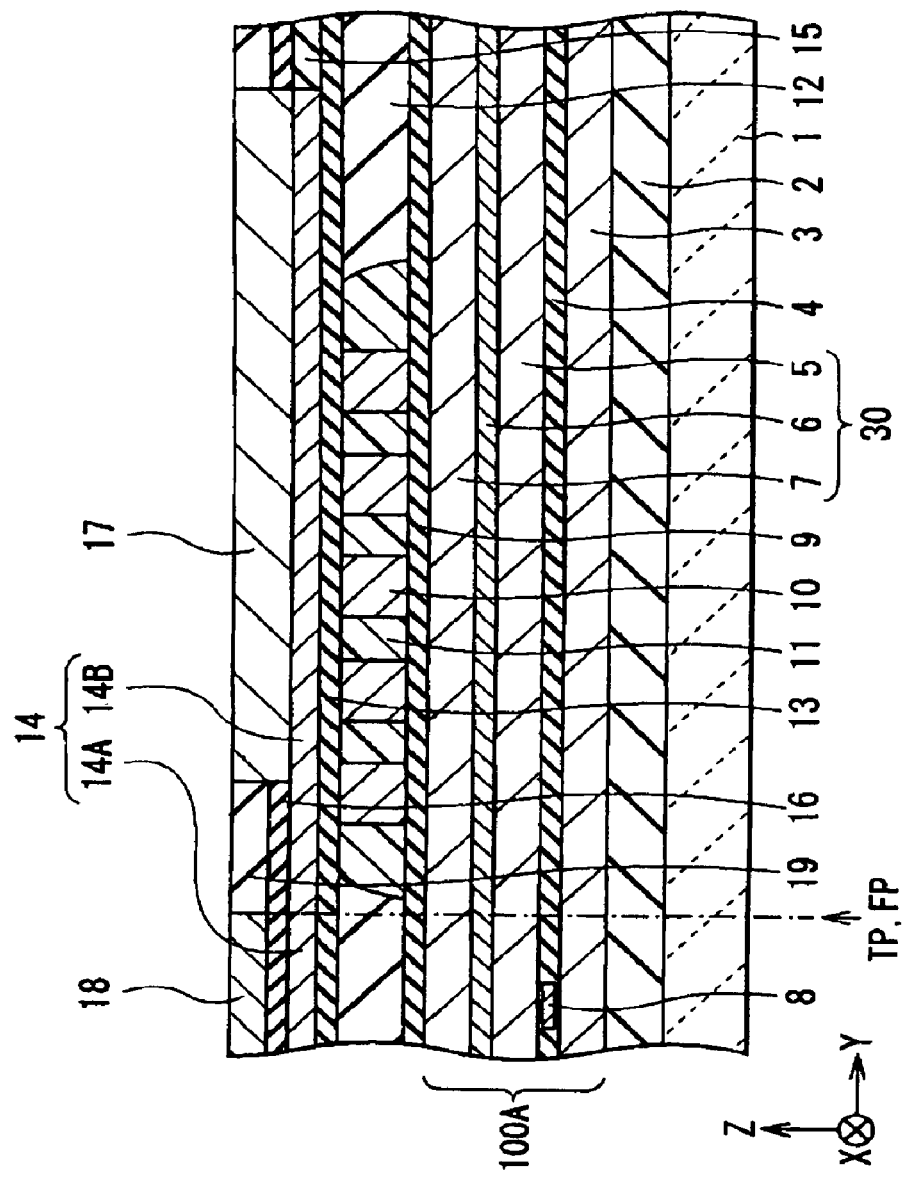
FIGS. 7A and 7B are sectional views for explaining a step subsequent to that of FIGS. 6A and 6B.
Figure 7A:
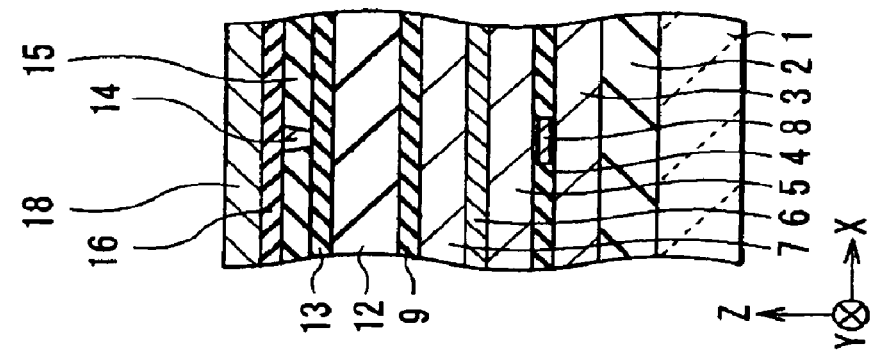

Subsequently, the nonmagnetic layer 19 is selectively removed until the auxiliary magnetic pole layer 17 is exposed at least and the whole configuration is made flat as shown in FIGS. 7A, 7B, thereby filling up a space between the auxiliary magnetic pole layer 17 and the write shield layer 18 with the nonmagnetic layer 19. In this case, flattening may be carried out using a polishing method such as chemical mechanical polishing (CMP), or an etching method such as ion milling or reactive ion etching (RIE). Among them, the polishing method is preferred in order to increase surface smoothness through a rather simple production process. The flattening procedure may be completed when the auxiliary magnetic pole layer 17 is exposed, or may be continued even after the exposure of the auxiliary magnetic pole layer 17 so as to adjust/obtain a desirable thickness thereof.

Figure 8B:
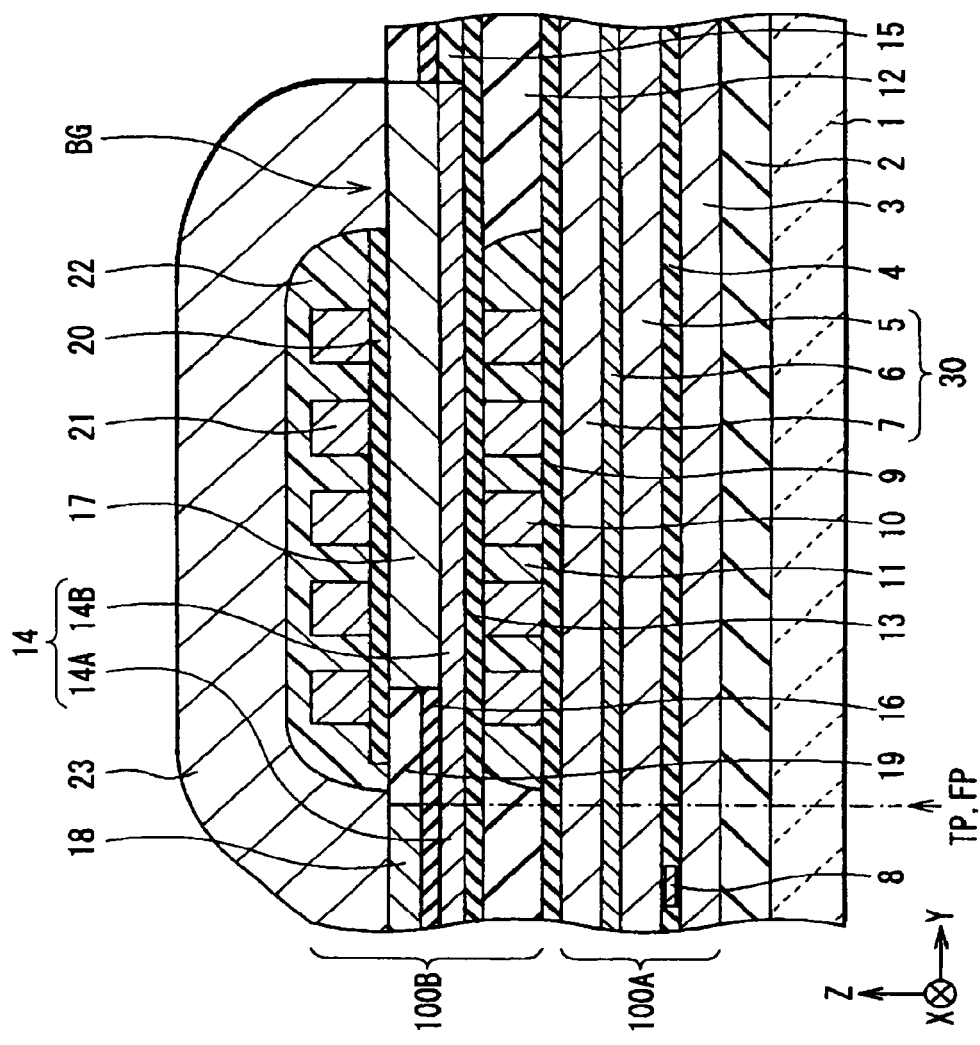
FIGS. 8A and 8B are sectional views for explaining a step subsequent to that of FIGS. 7A and 7B.
Figure 8A:
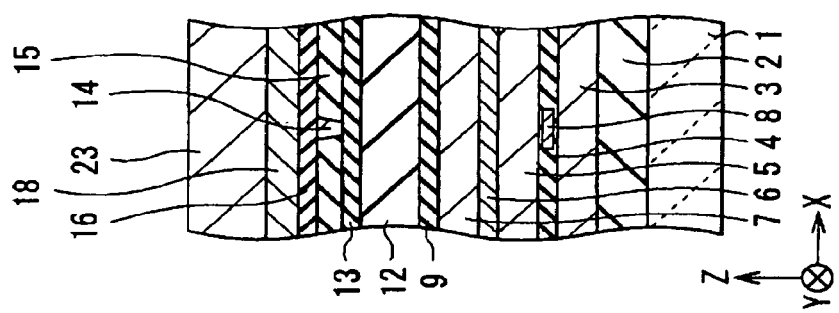

Subsequently, after forming the insulating layer 20 by sputtering for example, on the foregoing flattened face, the thin film coil 21 is formed on the insulating layer 20 by frame electroplating for example as shown in FIGS. 8A and 8B. In this case, position of the insulating layer 20 is adjusted so as to cover the area where the thin film coil 21 is to be formed in a post-production process. Subsequently, the insulating layer 22 is formed so as to cover the insulating layer 20, the thin film coil 21 and also their peripheral region. In this case, for example, photoresist is applied and then heated until it flows backward, so that its front edge retreats rather than that of the nonmagnetic layer 19.

Finally, the return yoke layer 23 is formed by frame electroplating method for example on the auxiliary magnetic pole layer 17, the write shield layer 18, and the insulating layer 22. In this manner, the principal portion of the write head section 100B is thereby completed.

In the thin film magnetic head and method of manufacturing the same according to the present embodiment, when the main magnetic pole layer 14 having a specified internal stress and the auxiliary magnetic pole layer 17 disposed on the trailing side of the main magnetic pole layer 14 in a position being recessed from that are provided, the nonmagnetic layer 19, which is disposed in a layer same as the auxiliary magnetic pole layer 17 and in an area in front of the layer, and which has an internal stress of a direction same as that of the main magnetic pole layer 14, is provided. With this arrangement, unintended erasure of information written on the write medium 50 can be suppressed at a non-writing time, by optimizing the magnetic domain structures of the main component elements that are engaged in writing operation for the following reasons.

Figure 9:
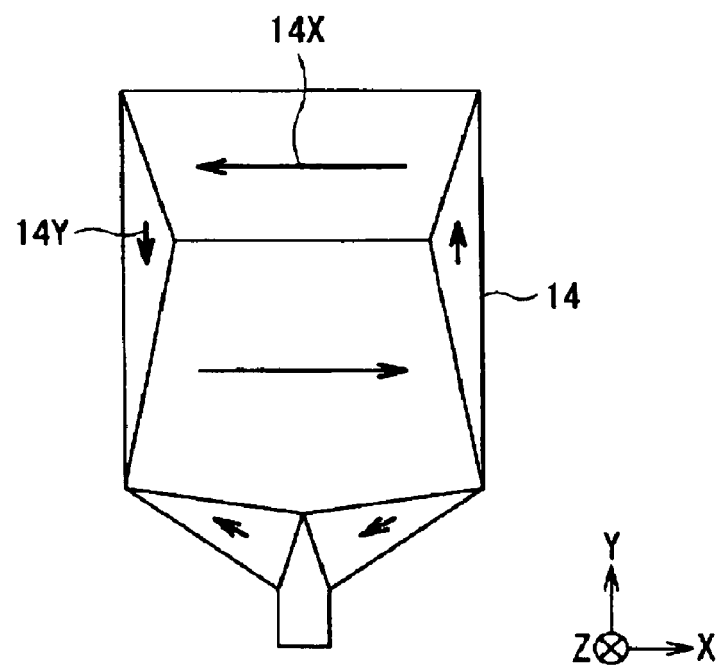
FIG. 9 indicates a magnetic domain structure of a main magnetic pole layer in the thin film magnetic head according to the first embodiment of the present invention.
Figure 10:
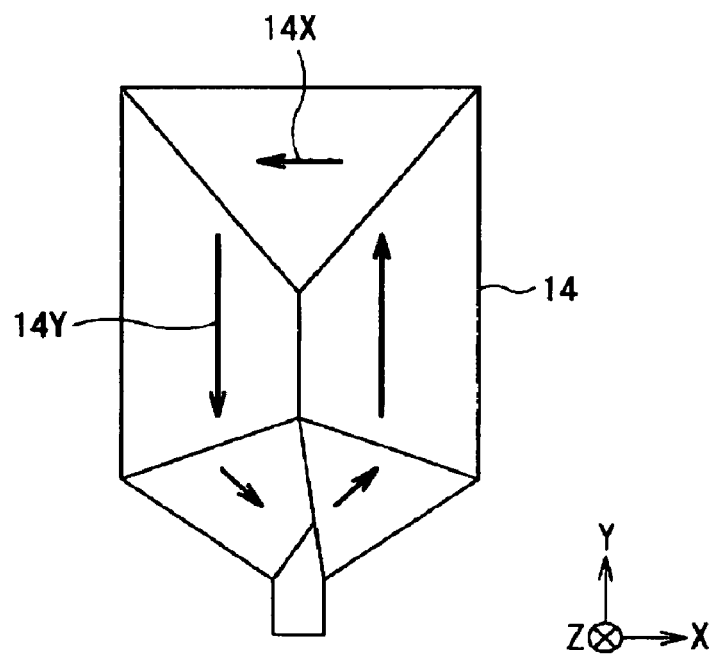
FIG. 10 shows a magnetic domain structure of a main magnetic pole layer in a thin film magnetic head according to a comparative example.
Figure 11:
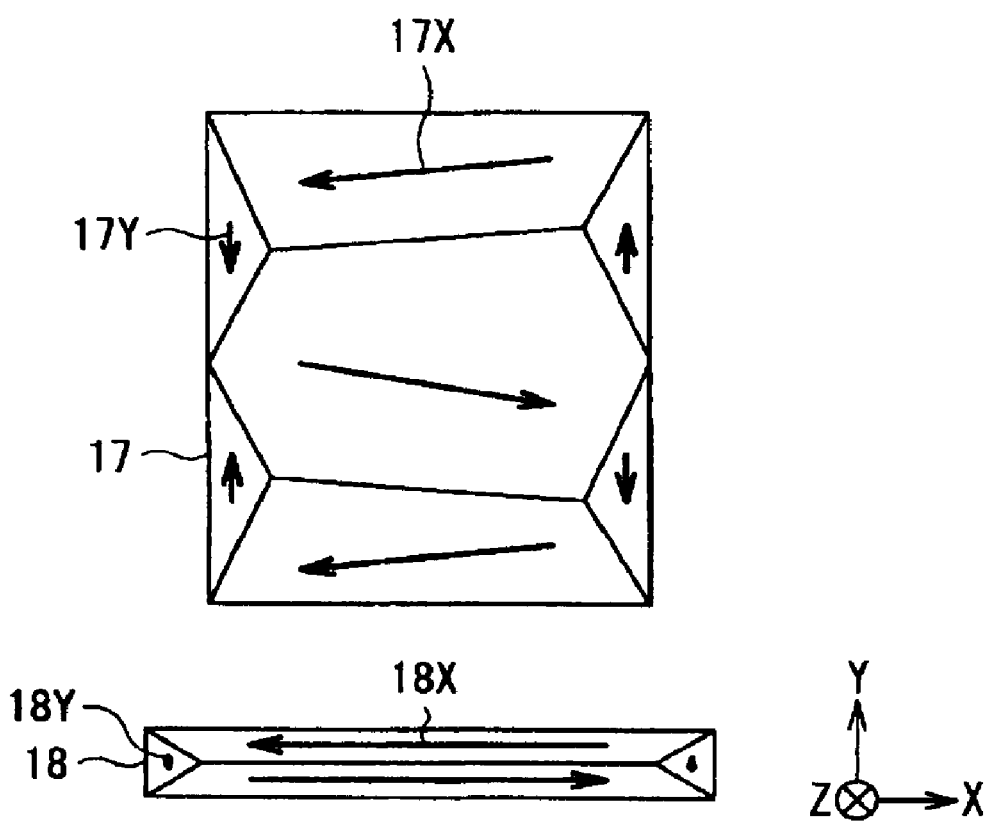
FIG. 11 shows magnetic domain structures of an auxiliary magnetic pole layer and a write shield layer in the thin film magnetic head according to the first embodiment of the present invention.

FIGS. 9 and 10 express magnetic domain structures of the main magnetic pole layer 14, and FIG. 9 shows a case of the present embodiment and FIG. 10 shows a case of a comparative example respectively. FIG. 11 shows magnetic domain structures of the auxiliary magnetic pole layer 17 and the write shield layer 18 in the present embodiment. The thin film magnetic head of the comparative example has the same configuration as that of the thin film magnetic head of the present embodiment except that it has an internal stress of a direction opposite to that of the main magnetic pole layer 14 because the nonmagnetic layer 19 is formed by sputtering and so on.

As for the latest head design, there is a tendency that thickness of the main magnetic pole layer 14 becomes increasingly thinner in order to realize high writing density by narrowing a track pitch. Accordingly, in order to secure quantity of the write magnetic flux, there is a tendency that the auxiliary magnetic pole layer 17, whose thickness is enlarged enough, is disposed together with the main magnetic pole layer 14. With such arrangement, the thickness of the nonmagnetic layer 19, which is disposed in a layer same as the auxiliary magnetic pole layer 17, naturally tends to be enlarged. In this case, the internal stress of the nonmagnetic layer 19, which is in the vicinity of the main magnetic pole layer 14 via the thin gap layer 16, will increase when the thickness of the nonmagnetic layer 19 is enlarged. As a result, there is a problem that the magnetic domain structure of the main magnetic pole layer 14 is influenced by the internal stress of the nonmagnetic layer 19.

In the comparative example, the nonmagnetic layer 19 has the internal stress of a direction opposite to that of the main magnetic pole layer 14. Therefore, the magnetic domain structure of the main magnetic pole layer 14 is deteriorated due to the influence of the internal stress of the nonmagnetic layer 19.

Specifically, as shown in FIG. 10, the magnetic domain structure of the main magnetic pole layer 14 is that the occupancy rate of a magnetization component 14Y, which is along the emission direction of the magnetic flux at the time of writing (Y-axis direction), is larger than the occupancy rate of a magnetization component 14X, which crosses (orthogonal) to the emission direction of the magnetic flux (X-axis direction). As a result, magnetic flux which remains in the main magnetic pole layer 14 is easily leaked out immediately after information-writing due to the magnetoelasticity effect, which occurs due to the magnetic domain structure in which the magnetization component 14Y is dominant. Accordingly, the magnetic domain structure of the main magnetic pole layer 14 is not optimized and therefore it becomes difficult to suppress unintended erasure of information written on the write medium 50 at a non-writing time.

In the present embodiment, on the other hand, the nonmagnetic layer 19 has the internal stress in a direction same as that of the main magnetic pole layer 14. Therefore, the magnetic domain structure of the main magnetic pole layer 14 is kept in a good state of the initial formation without being influenced by the internal stress of the nonmagnetic layer 19. Specifically, as shown in FIG. 9, the magnetic domain structure of the main magnetic pole layer 14 is that, unlike the case of the comparative example, the occupancy rate of the magnetization component 14X is larger than that of the magnetization component 14Y. As a result, magnetic flux which remains in the main magnetic pole layer 14 is hardly leaked out immediately after information-writing due to the magnetoelasticity effect.

Moreover in this case, not only the magnetic domain structure of the main magnetic pole layer 14 but also the magnetic domain structures of both of the auxiliary magnetic pole layer 17 and the write shield layer 18 can be kept in a good state without being influenced by the internal stress of the nonmagnetic layer 19. Specifically, as shown in FIG. 11, the magnetic domain structure of the auxiliary magnetic pole layer 17 is that the occupancy rate of a magnetization component 17X is larger than that of a magnetization component 17Y, according to the same operation as in the case of the magnetic domain structure of the main magnetic pole layer 14. As well, the magnetic domain structure of the write shield layer 18 is that the occupancy rate of a magnetization component 18X is larger than that of a magnetization component 18Y.

Accordingly, the magnetic domain structures of the main magnetic pole layer 14, the auxiliary magnetic pole layer 17, and the write shield layer 18 are optimized in the present embodiment. As a result, unintended erasure of information written on the write medium 50 can be suppressed at a non-writing time, by optimizing the magnetic domain structures of the main component elements that are engaged in writing operation.

Hereinafter, on behalf of the main magnetic pole layer 14, the auxiliary magnetic pole layer 17, and the write shield layer 18, the principle of optimization for the magnetic domain structure of the main magnetic pole layer 14 will be explained with a specific example, which is as follows.

When a magnetic material having a positive magnetostriction constant is used as the component material of the main magnetic pole layer 14, it will have a tensile stress as its internal stress. In this case, if the magnetostriction constant is $\lambda$, the stress is $\sigma$, and the magnetization is M, a magnetic field H induced by the internal stress in the main magnetic pole layer 14 is expressed as $H=3\lambda$ ($\sigma/M$) as a relation between the internal stress of the main magnetic pole layer 14 and the magnetic domain structure. The easy magnetization directions of the main magnetic pole layer 14 are in agreement with the direction of the tensile stress, when the tensile stress is given in a direction parallel to the air bearing surface 40. It is deduced from the fact that a tensile stress is preferred as the internal stress of the main magnetic pole layer 14.

As an example, if an iron-cobalt based alloy, whose saturation magnetic flux density is 2.2 T (tesla) or more is used as a component material of the main magnetic pole layer 14, the magnetostriction constant $\lambda$ of the main magnetic pole layer 14 will become $20 \times 10^{-6}$ or more, and a tensile stress of 400 MPa or more will be generated as internal stress. On the other hand, if an aluminum oxide is used as a formation material of the nonmagnetic layer 19 and sputtering is used as its formation method, a compressive stress of about 100 MPa or less will be generated as internal stress. In view of those described above, since Young's modulus and Poisson's ratio of the iron-cobalt based alloy are 121 GPa and 0.25 respectively, while Young's modulus and Poisson's ratio of the aluminum oxide are 150 GPa and 0.3 respectively, the internal stress, which is produced in the nonmagnetic layer 19, has a direction opposite to that of the internal stress (tensile stress) produced in the main magnetic pole layer 14, namely, it becomes a compressive stress.

In the present embodiment, since the ALD method is used in the formation of the nonmagnetic layer 19, unlike the case where sputtering is used, a tensile stress of about 200 MPa to 300 MPa is generated in the nonmagnetic layer 19. Accordingly, the magnetic domain structure of the main magnetic pole layer 14 is kept in a good state without being influenced by the internal stress of the nonmagnetic layer 19 as described above. Therefore the magnetic domain structure is optimized so that residual flux in the main magnetic pole layer 14 may hardly be leaked out immediately after information-writing due to the magnetoelasticity effect.

In addition, in the present embodiment, the auxiliary magnetic pole layer 17 is disposed on the trailing side of the main magnetic pole layer 14. As a result, unlike a case where the auxiliary magnetic pole layer 17 is disposed on the leading side of the main magnetic pole layer 14, unintended erasure of information can be suppressed at the time of writing, for the following reasons.

In order to increase intensity of the perpendicular magnetic field, it is preferred to dispose the auxiliary magnetic pole layer 17 having a large magnetic volume as close as possible to the air bearing surface 40 so that the amount of magnetic flux supplied to the tip portion 14A of the main magnetic pole layer 14 can be increased. However, if the auxiliary magnetic pole layer 17 is disposed close to the air bearing surface 40 too much, magnetic flux in the auxiliary magnetic pole layer 17 is easily emitted directly outside, not through the main magnetic pole layer 14 at the time of writing. So there is a concern that information may be easily erased without intention due to the magnetic flux. When the auxiliary magnetic pole layer 17 is disposed on the leading side of the main magnetic pole layer 14, magnetic substance for taking in the magnetic flux does not exist in front of the auxiliary magnetic pole layer 17. With this arrangement, information is easily erased due to the magnetic flux directly emitted outside from the auxiliary magnetic pole layer 17. On the other hand, when the auxiliary magnetic pole layer 17 is disposed on the trailing side of the main magnetic pole layer 14, the write shield layer 18 and the return yoke layer 23, which are magnetic substances for taking in the magnetic flux, are disposed in front of the auxiliary magnetic pole layer 17. With this arrangement, even when magnetic flux is nearly emitted directly outside from the auxiliary magnetic pole layer 17, the magnetic flux can be taken in by the write shield layer 18 and the return yoke layer 23. In this manner, unintended erasure of information at the time of writing can be thereby prevented.

In this case, if the auxiliary magnetic pole layer 17 is brought closer to the air bearing surface 40, the space between the auxiliary magnetic pole layer 17 and the write shield layer 18 is narrowed, and consequently it becomes difficult to fill up the space with the nonmagnetic layer 19. In view of that, the present embodiment adopts the ALD method as a formation method of the nonmagnetic layer 19, which is advantageous to a precise membrane formation. As a result, in the present embodiment, unlike the case where methods that are disadvantageous to a precise membrane formation such as sputtering is used, not only can the nonmagnetic layer 19 be formed so as to have a tensile stress as its internal stress, but the nonmagnetic layer 19 can precisely fill up a narrow space between the auxiliary magnetic pole layer 17 and the write shield layer 18.

Although only the nonmagnetic layer 19 disposed in a layer same as the auxiliary magnetic pole layer 17 is made to have an internal stress of a direction same as that of the main magnetic pole layer 14 in the present embodiment, it is not necessarily restricted to that, and other nonmagnetic layers (layers made of any nonmagnetic substance) disposed in a layer different from that of the auxiliary magnetic pole layer 17 may have a similar internal stress. Examples of "other nonmagnetic layers" described above include the insulating layer 13, the nonmagnetic layer 15, and the gap layer 16 disposed in the vicinity of the main magnetic pole layer 14. Since thicknesses of those layers are remarkably thinner than the thickness of the nonmagnetic layer 19, their internal stresses have little effect on the magnetic domain structure of the main magnetic pole layer 14. Accordingly, the magnetic domain structure of the main magnetic pole layer 14 will be optimized in many cases if the nonmagnetic layer 19 has a proper internal stress. However, in order to reliably suppress the influence exerted on the magnetic domain structure of the main magnetic pole layer 14 by the internal stresses of the insulating layer 13, the nonmagnetic layer 15, and the gap layer 16, it is preferred that they also have the same internal stress as that of the nonmagnetic layer 19. All of the insulating layers 13, the nonmagnetic layers 15, and the gap layers 16 may have the same internal stress as that of the nonmagnetic layer 19, or only some of them may have. In this case, as compared with a case where only the nonmagnetic layer 19 has the internal stress of the same direction as that of the main magnetic pole layer 14, the magnetic domain structure of the main magnetic pole layer 14 can be optimized with much stability.

Further, in the present embodiment, although both of the thin film coils 10 and 21 are provided, it is not necessarily limited to that, and only the thin film coil 21 may be provided. In this case, as with the thin film coil 10, the insulating layers 11 to 13 for burying the thin film coil 10 will also become unnecessary. With this arrangement, effects similar to the foregoing embodiment can be obtained.

Second Embodiment

Figures 12A, 12B:
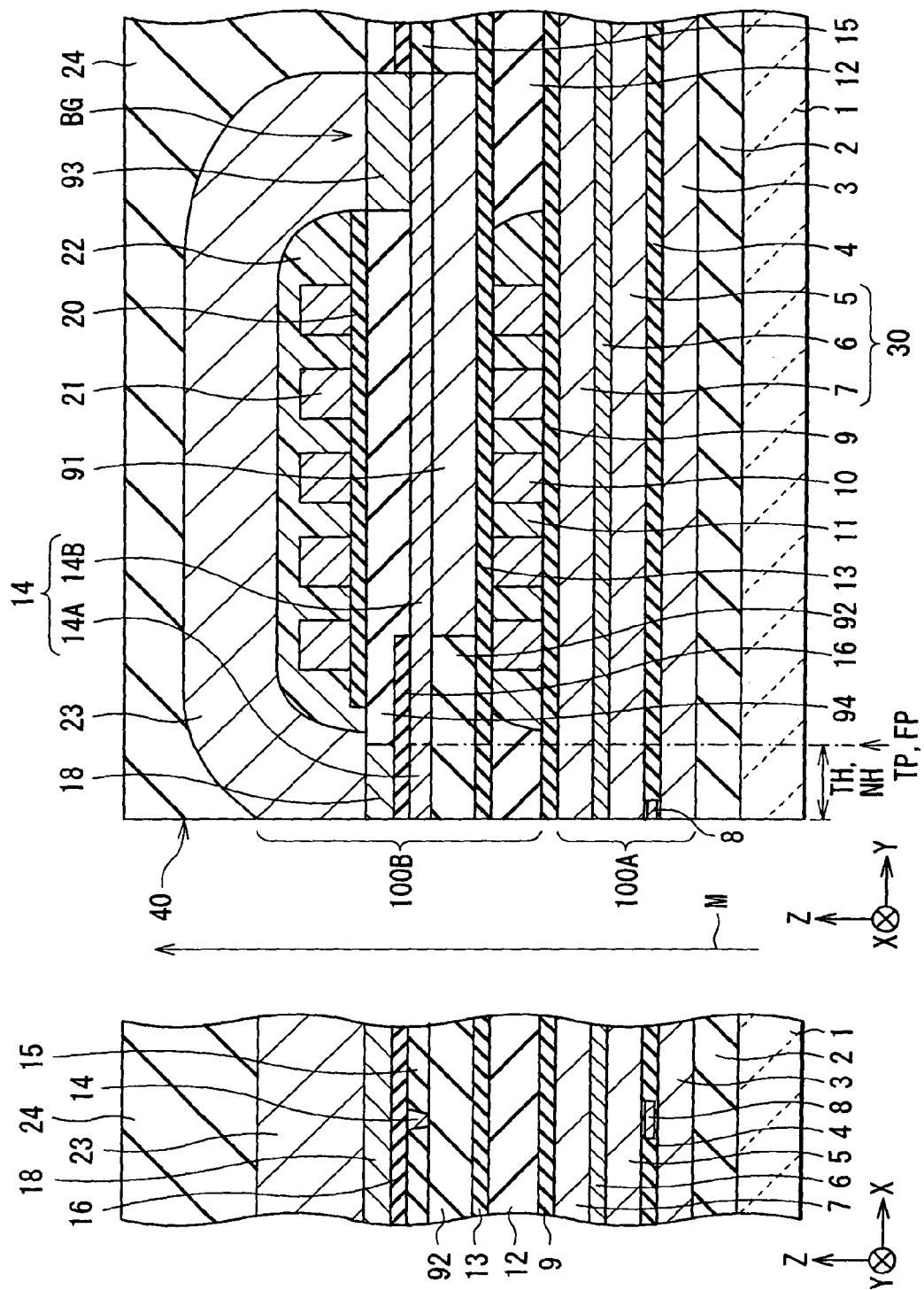
FIGS. 12A and 12B are cross-sectional views showing a sectional configuration of a thin film magnetic head according to a second embodiment of the present invention.

Next, configuration of a thin film magnetic head according to a second embodiment of the present invention will be described. FIGS. 12A and 12B illustrate configurations of a thin film magnetic head, showing cross-sectional configurations corresponding to FIGS. 1A and 1B respectively. FIGS. 13A and 13B to 17A and 17B are views for explaining a manufacturing process of the thin film magnetic head, showing cross-sectional configurations corresponding to FIGS. 12A and 12B respectively. In FIGS. 12A and 12B to 17A and 17B, the same reference numerals are given to the same component elements as those shown in the first embodiment.

In the thin film magnetic head according to the present embodiment, unlike the first embodiment in which the auxiliary magnetic pole layer 17 is located on the trailing side of the main magnetic pole layer 14, an auxiliary magnetic pole layer 91 is located on the leading side of the main magnetic pole layer 14. Such structure as the auxiliary magnetic pole layer 91 is located on the leading side is called bottom yoke structure. This thin film magnetic head is configured in the same manner as the thin film magnetic head of the first embodiment except that, for example, as shown in FIGS. 12A and 12B, (1) the auxiliary magnetic pole layer 91 with its periphery buried by a nonmagnetic layer 92 is provided between the insulating layer 13 and the main magnetic pole layer 14; (2) a connection layer 93 is provided in a layer where the auxiliary magnetic pole layer 17 was disposed, on the area where the back gap BG is provided; and (3) a space between the write shield layer 18 and the connection layer 93 is filled up with a nonmagnetic layer 94.

The auxiliary magnetic pole layer 91 has the same function and same configuration as the auxiliary magnetic pole layer 17, and the nonmagnetic layer 92 has the same configuration as the nonmagnetic layer 19. Namely, when the main magnetic pole layer 14 has the internal stress of a specified direction (for example, tensile stress), the nonmagnetic layer 92 disposed in a layer same as the auxiliary magnetic pole layer 91 and in an area in front of the layer has the internal stress of the same direction as that of the main magnetic pole layer 14 (for example, tensile stress) because it is formed by the ALD method and so on.

The connection layer 93 is a layer magnetically connecting the main magnetic pole layer 14 and the return yoke layer 23. At the time of the operation of the thin film magnetic head, the magnetic flux taken in by the return yoke layer 23 is resupplied to the main magnetic pole layer 14 and the auxiliary magnetic pole layer 91 via the connection layer 93.

The nonmagnetic layer 94 has the same function as the nonmagnetic layer 19. The nonmagnetic layer 94 may have the internal stress of the same direction as that of the main magnetic pole layer 14 as with the nonmagnetic layer 19, or may have the internal stress of a direction opposite to that. It is because, in many cases, the magnetic domain structure of main magnetic pole layer 14 can be optimized if only the nonmagnetic layer 92 has the internal stress of the same direction as that of the main magnetic pole layer 14 as described above, even if the nonmagnetic layer 94 does not have the internal stress of the same direction as the main magnetic pole layer 14. Further, it is because the thickness (magnetic volume) of the write shield layer 18 and the connection layer 93 does not need to be so large as that of the auxiliary magnetic pole layer 91, and therefore the thickness of the nonmagnetic layer 94 may be comparatively thin. As a result, influence exerted by the internal stress of the nonmagnetic layer 94 on the magnetic domain structure of the main magnetic pole layer 14 is small. However, in order to reliably suppress the influence exerted by the internal stresses of the nonmagnetic layer 94 on the magnetic domain structure of the main magnetic pole layer 14, it is preferred that the nonmagnetic layer 94 also has the same internal stress as that of the nonmagnetic layer 92.

Figure 13B:
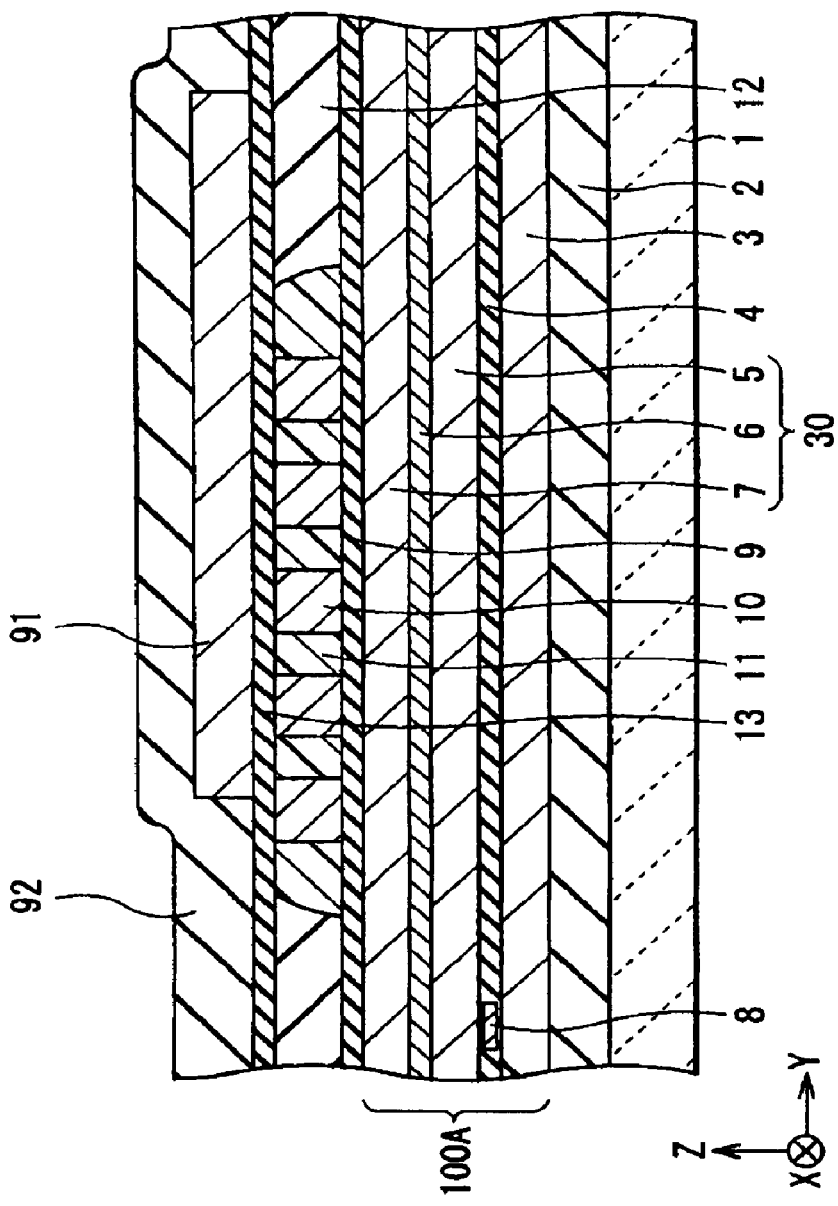
FIGS. 13A and 13B are sectional views for explaining one production process in a manufacturing process of the thin film magnetic head according to the second embodiment of the present invention.
Figure 13A:
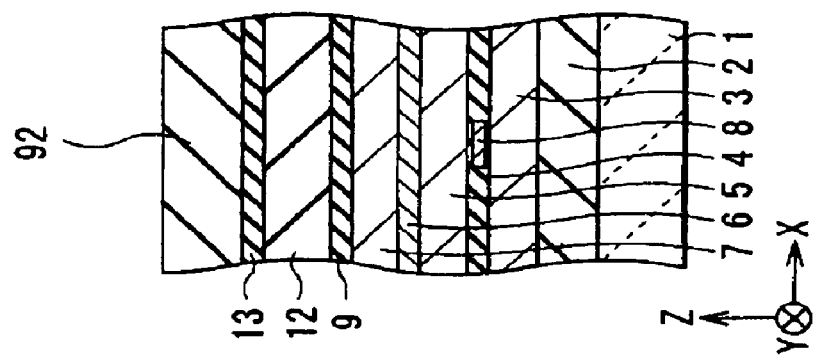

The thin film magnetic head is manufactured by the same procedure as the first embodiment except the points as explained below. Upon forming a principal portion of the write head section 100B, after formation of the insulating layer 13, the auxiliary magnetic pole layer 91 is formed on the insulating layer 13 by frame electroplating for example, then the nonmagnetic layer 92 is formed by the ALD method for example so as to cover the auxiliary magnetic pole layer 91 and the insulating layer 13 disposed in the periphery thereof, as shown in FIGS. 13A, 13B. In this case, the nonmagnetic layer 92 is to be embedded in front of the auxiliary magnetic pole layer 91 at least, and to have the internal stress (for example, tensile stress) of the same direction as that of the main magnetic pole layer 14, which will be formed in a post-production process.

Subsequently, the nonmagnetic layer 92 is selectively removed until at least the auxiliary magnetic pole layer 91 is exposed to make the whole configuration flat, thereby embedding the nonmagnetic layer 92 in the periphery of the auxiliary magnetic pole layer 91 as shown in FIGS. 14A and 14B.

Figure 15B:
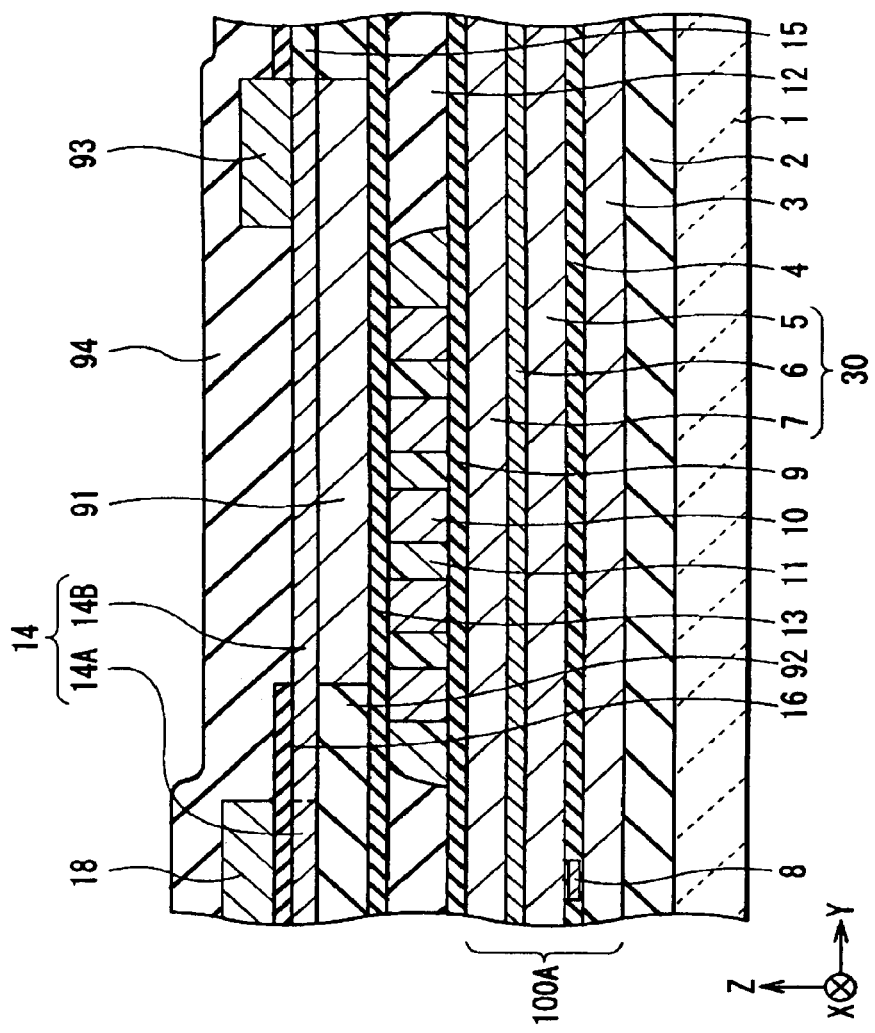
FIGS. 15A and 15B are sectional views for explaining a step subsequent to that of FIGS. 14A and 14B.
Figure 15A:
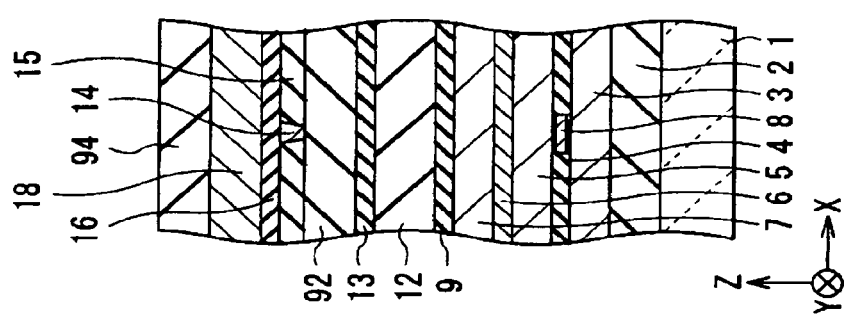

Subsequently, as shown in FIGS. 15A and 15B, the main magnetic pole layer 14 is formed on the above-described flattened face by frame electroplating for example. In this case, the main magnetic pole layer 14 is made to have a specified internal stress (for example, tensile stress). Subsequently, after forming the gap layer 16 on the main magnetic pole layer 14 by sputtering for example, the connection layer 93 is selectively formed on an exposure of the main magnetic pole layer 14 by frame electroplating for example, and the write shield layer 18 is formed on the gap layer 16. In this case, the connection layer 93 and the write shield layer 18 may be formed in a same production process, or they may be formed in a separate production process. Subsequently, the nonmagnetic layer 94 is formed so that the main magnetic pole layer 14, the gap layer 16, the connection layer 93, and the write shield layer 18 may be all covered. In this case, the nonmagnetic layer 94 is made to be embedded between the connection layer 93 and the write shield layer 18 at least. As for a formation method of the nonmagnetic layer 94, the ALD method or the like may be used in order to have the internal stress of the same direction as that of the main magnetic pole layer 14, or sputtering or the like may be used in order to have the internal stress of a direction opposite to that.

Figure 16B:
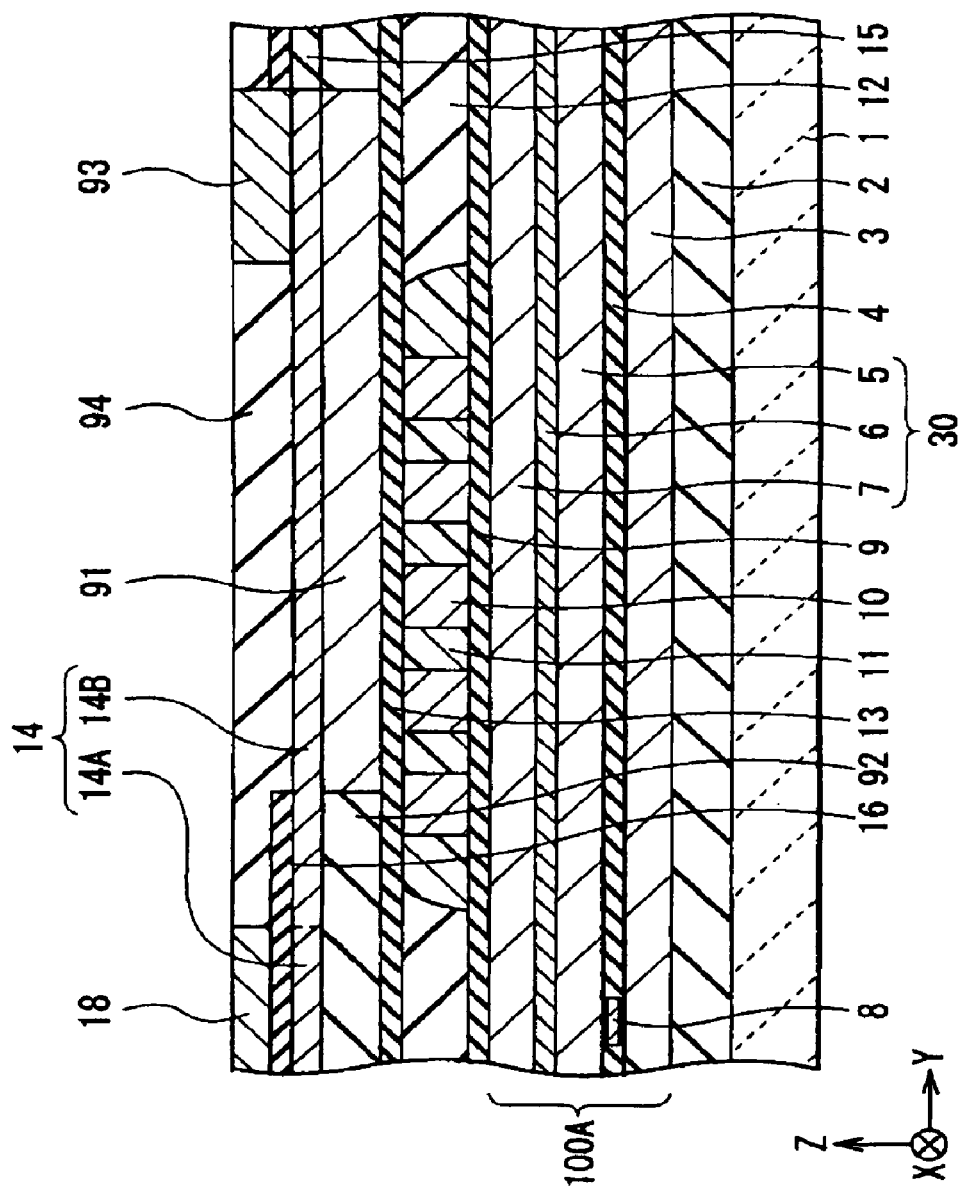
FIGS. 16A and 16B are sectional views for explaining a step subsequent to that of FIGS. 15A and 15B.
Figure 16A:
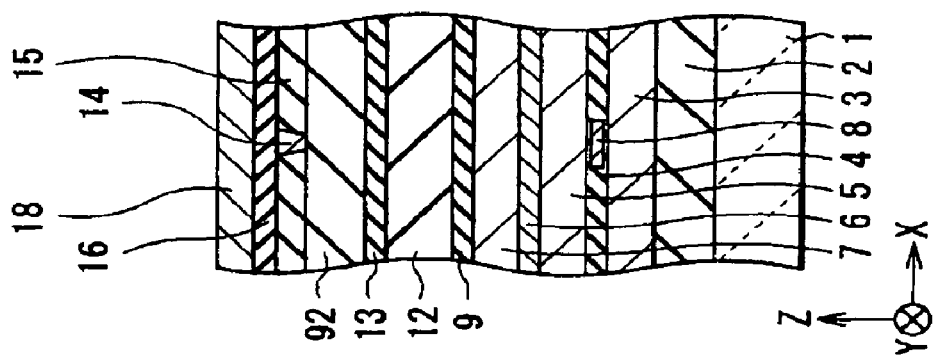

Subsequently, the nonmagnetic layer 94 is selectively removed until the connection layer 93 is exposed at least to make the whole configuration flat, as shown in FIGS. 16A and 16B, thereby filling up a space between the connection layer 93 and the write shield layer 18 with the nonmagnetic layer 94.

Subsequently, as shown in FIGS. 17A and 17B, the thin film coil 21 buried in the insulating layer 20, 22 and the return yoke layer 23 are formed in accordance with a procedure explained with reference to FIGS. 8A and 8B. Specifically, the insulating layer 20 is formed on the flat face after the above-mentioned flattening process, then, after forming the thin film coil 21 on the insulating layer 20, the insulating layer 22 is formed so as to cover the insulating layer 20, the thin film coil 21 and its peripheral region. After this, the return yoke layer 23 is selectively formed on the connection layer 93, the write shield layer 18 and the insulating layer 22. In this manner, the principal portion of the write head section 100B is completed.

In the thin film magnetic head and method of manufacturing the same according to the present embodiment, when the main magnetic pole layer 14 having a specified internal stress and the auxiliary magnetic pole layer 91 disposed on the leading side of the main magnetic pole layer 14 in a position being recessed from that are provided, the nonmagnetic layer 92, which is disposed in a layer same as the auxiliary magnetic pole layer 91 and in an area in front of the layer and which has the internal stress of the same direction as that of the main magnetic pole layer 14, is provided. With this arrangement, the magnetic domain structure of the main magnetic pole layer 14 is kept in a good state of the initial formation without being influenced by the internal stress of the nonmagnetic layer 92 in accordance with the same operation as the first embodiment. Accordingly, unintended erasure of information written on the write medium 50 can be suppressed at a non-writing time by optimizing magnetic domain structures of the main component elements that are engaged in writing operation.

In particular, in the present embodiment, the magnetic domain structure of the main magnetic pole layer 14 can be optimized with much stability if not only the nonmagnetic layer 92 but also the nonmagnetic layer 94 are made to have the internal stress of the same direction as that of the main magnetic pole layer 14.

It is to be noted that the operations, effects, and modifications of the present embodiment are the same as those of the foregoing first embodiment except for the points described above.

Figure 18:
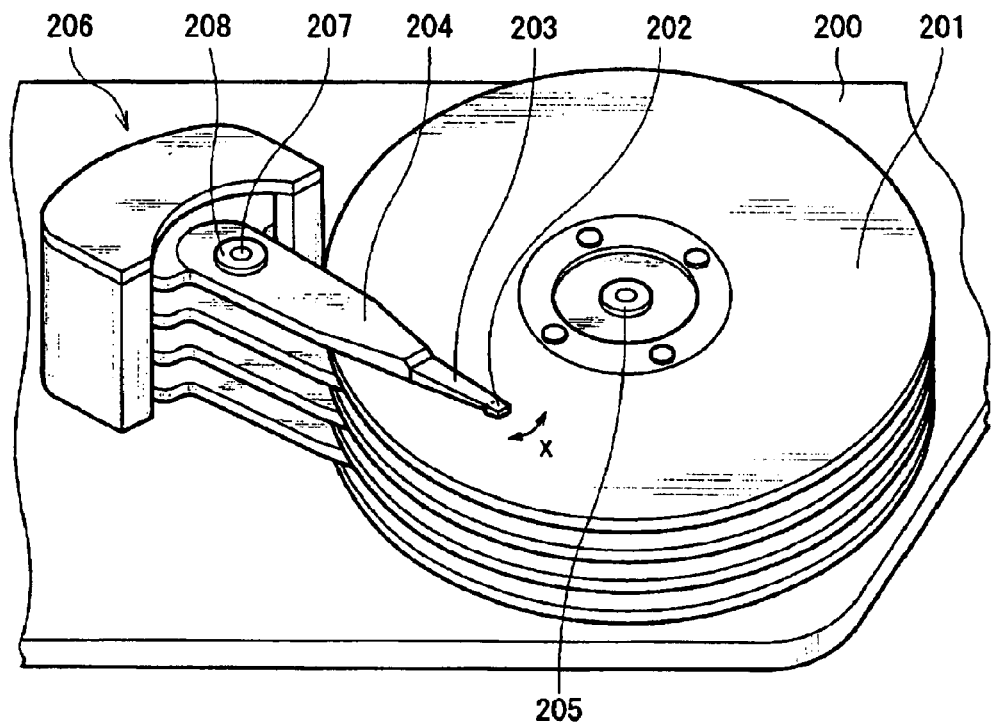
FIG. 18 is a perspective view showing a configuration of a magnetic write system which carries the thin film magnetic head of the present invention.
Figure 19:
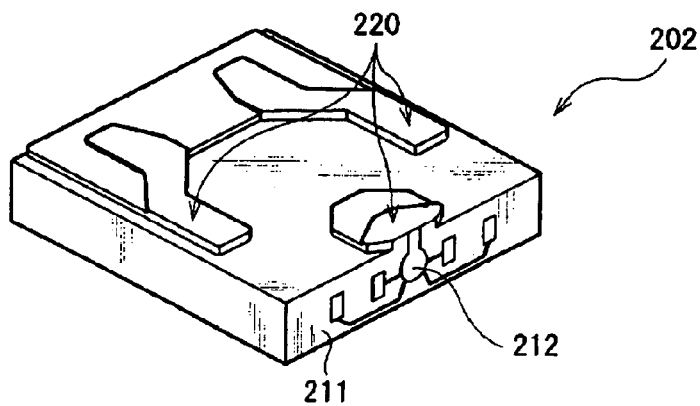
FIG. 19 is a perspective view showing a configuration of a principal portion of the magnetic write system illustrated in FIG. 18.

Next, a configuration of a magnetic write system which carries the above-mentioned thin film magnetic head will be explained. FIGS. 18 and 19 illustrate the configuration of the magnetic write system, and, FIG. 18 illustrates a whole perspective configuration thereof and FIG. 19 illustrates a perspective configuration of the principal portion respectively.

As shown in FIG. 18, this magnetic write system, which is a hard disk drive for example, includes within a case 200: a plurality of magnetic disks (for example, hard disk) 201 corresponding to the write medium 50 (reference to FIG. 4); a plurality of suspensions 203, each of them arranged corresponding to the magnetic disk 201 to support a magnetic head slider 202 at one ends thereof; and a plurality of arms 204, each of them supporting the other end of the suspension 203. The magnetic disk 201 can rotate around a spindle motor 205 which is fixed to the case 200. The arm 204 is connected with a driving section 206 as a power source, and can turn with respect to a fixed axle 207 which is fixed to the case 200 via a bearing 208. The driving section 206 includes such driving sources as a voice coil motor, for example. This magnetic write system is a model in which the plurality of arms 204 can turn integrally with respect to the fixed axle 207, for example. It is to be noted that the case 200 is partially cut out to easily show the internal structure of the magnetic write system in FIG. 18.

The magnetic head slider 202 is configured in such a manner that, as shown in FIG. 19 for example, a thin film magnetic head 212 is attached to one side of a base 211, which is of an abbreviated rectangular parallelepiped in shape and which is made of nonmagnetic insulation materials such as altic. One side (that is, an air bearing surface 220) of this base 211 is formed unevenly for example for decreasing air resistance produced at the time of the turn of the arms 204. And the thin film magnetic head 212 is attached to another side orthogonal to the air bearing surface 220 (in this case, the front right side in FIG. 19). This thin film magnetic head 212 has the configuration explained in each of the above-mentioned embodiments. The magnetic head slider 202, when the magnetic disk 201 rotates at the time of information writing or reading, lifts up from the writing surface of the magnetic disk 201 (surface opposed to the magnetic head slider 202) using an airflow produced between the writing surface of the magnetic disk 201 and the air bearing surface 220. It is to be noted that in FIG. 19, the magnetic head slider 202 is illustrated in an upside-down state compared with that of FIG. 18, in order to easily show the structure on the side of the air bearing surface 220 of the magnetic head slider 202.

In this magnetic write system, the arm 204 turns at the time of information writing or reading so that the magnetic head slider 202 can move to a specified area of the magnetic disk 201 (write area). And when the thin film magnetic head 212 is connected electrically in such a state as opposed to the magnetic disk 201, the thin film magnetic head 212 carries out write or read processing to the magnetic disk 201 based on the above-mentioned operation principal.

In this magnetic write system, since the above-mentioned thin film magnetic head is arranged, unintended erasure of information written on the magnetic disk 201 can be suppressed at a non-writing time.

Next, examples of the present invention will be explained hereinbelow.

Figure 20:
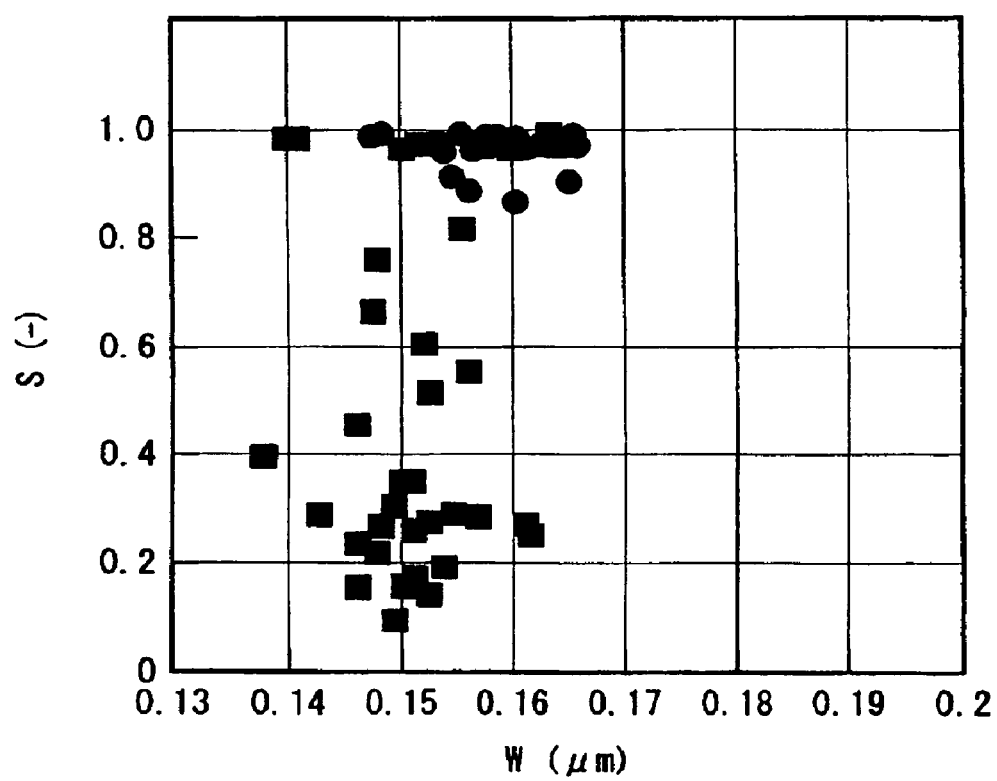
FIG. 20 shows a write width dependency of write signal deterioration.

When the write performance of the thin film magnetic head that has a top yoke structure (reference to FIGS. 1A and 1B to FIG. 4) of the first embodiment was investigated on behalf of the thin film magnetic heads explained in the first and second embodiments, such results as shown in FIG. 20 were obtained. FIG. 20 shows a write width dependency of write signal deterioration on a write width, the horizontal direction showing a write width W (μm), and the vertical direction showing a signal strength ratio S (–), respectively. The write width expresses a width of a writing track on the write medium 50.

As for the component material, the thickness, and the formation method (internal stress) of the main component elements of the thin film magnetic head upon investigating the deterioration state of the write signal, the following conditions were adopted respectively: the main magnetic pole layer 14: iron, cobalt alloy, 0.25 μm, and frame electroplating method (tensile stress), the gap layer 16: alumina, 0.04 μm, and sputtering method (compressive stress), the auxiliary magnetic pole layer 17: permalloy, 0.8 μm, and frame electroplating method (tensile stress), the write shield layer 18; permalloy, 0.76 μm, and frame electroplating method (tensile stress) the nonmagnetic layer 19: alumina, 0.76 μm, and the ALD method (tensile stress).

Procedure of investigating the deterioration state of the write signals by use of the thin film magnetic head was as follows: write processing was carried out to the write medium 50 in a writing state (a state in which the thin film coil 21 was energized), then after tracing the write medium 50 in a non-writing state (a state in which the thin film coil 21 was not energized) as with the case of writing state, the read processing was carried out to the write medium 50. At that time, an intensity S1 of the write signal before tracing and an intensity S2 of the read signal after tracing were investigated and thereby, the signal strength ratio S (=S2/S1) was calculated. This signal strength ratio S is a parameter indicative of an attenuance of the write signal before/after the tracing, namely, how easy it is to erase information without intention at a non-writing time.

In addition, upon investigating the deterioration state of the write signal about the thin film magnetic head of the present invention, deterioration state of the write signal was investigated also about the thin film magnetic head of the comparative example described in the first embodiment, in which the nonmagnetic layer 19 had a compressive stress, in order to make a comparative evaluation thereof. In this case, component material, thickness, and formation method of the nonmagnetic layer 19 were alumina, 0.76 μm, and sputtering method respectively. FIG. 20 also shows a result of the comparative example together with the result of the present invention, and ● is of the present invention and ■ is of the comparative example respectively.

As known by the results shown in FIG. 20, in the comparative example, when the write width W was varied within a range of 0.138 μm to 0.164 μm, the signal strength ratio S was distributed over a wide range of about 0.09 to 1. On the other hand, in the present invention, when the write width W was varied within a range of 0.148 μm to 0.166 μm, the signal strength ratio S was distributed over a narrow range of 0.87 to 1. The foregoing results mean that the write signal is maintained with ease in the present invention compared with that of the comparative example, namely, that information is hardly erased at a non-writing time. In view of the above, it was confirmed that in the thin film magnetic head of the present invention, unintended erasure of information written on write medium 50 can be suppressed at a non-writing time.

Although the present invention has been described above with reference to the embodiments and examples, the invention is not limited to the embodiments but can be variously modified. For example, although the above-mentioned embodiments have explained the combined magnetic write and read head as a structure of the thin film magnetic head, it is not necessarily restricted to this, and the perpendicular magnetic write head of the present invention can be applied to a write-only head having an induction type magnetic transducer element for write, and also to a write and read head having an induction type magnetic transducer element for both of writing and reading. It is needless to say that the perpendicular magnetic write head of the present invention is applicable also to a head configured in such a manner that stacking sequence of a write element and a read element are reversed.

What is claimed is:

1. A perpendicular magnetic write head, comprising:
a main magnetic pole layer leading a magnetic flux to a write medium, the main magnetic pole layer having an internal stress of a specified direction;
an auxiliary magnetic pole layer disposed on a trailing side of the main magnetic pole layer, the auxiliary magnetic pole layer being recessed from the main magnetic pole layer;
a nonmagnetic layer disposed in a layer same as the auxiliary magnetic pole layer and in front of the auxiliary magnetic pole layer, the nonmagnetic layer having an internal stress of a direction same as that of the main magnetic pole layer; and
a write shield layer disposed in a layer same as the auxiliary magnetic pole layer and in front of the auxiliary magnetic pole layer, the write shield layer being separated from the main magnetic pole layer with a gap layer in between, wherein
the nonmagnetic layer is arranged to fill up a space between the auxiliary magnetic pole layer and the write shield layer.

2. The perpendicular magnetic write head according to claim 1, wherein both the main magnetic pole layer and the nonmagnetic layer have a tensile stress.

3. The perpendicular magnetic write head according to claim 1, wherein the nonmagnetic layer is formed by ALD (atomic layer deposition) method.

4. The perpendicular magnetic write head according to claim 1, wherein the nonmagnetic layer is made of Aluminum Oxide ($AlO_x$) or Aluminum Nitride (AlN).

5. A perpendicular magnetic write head, comprising:
a main magnetic pole layer leading a magnetic flux to a write medium, the main magnetic pole layer having an internal stress of a specified direction;
an auxiliary magnetic pole layer disposed on a leading side of the main magnetic pole layer, the auxiliary magnetic pole layer being recessed from the main magnetic pole layer;
a nonmagnetic layer disposed in a layer same as the auxiliary magnetic pole layer and in front of the auxiliary magnetic pole layer, the nonmagnetic layer having an internal stress of a direction same as that of the main magnetic pole layer;
a write shield layer disposed on the trailing side of the main magnetic pole layer in an area close to an airbearing surface, the write shield layer being separated from the main magnetic pole layer with a gap layer in between; and
another nonmagnetic layer disposed in a layer same as the write shield layer at the back of the write shield layer, the another nonmagnetic layer having an internal stress of a direction same as that of the main magnetic pole layer.

6. The perpendicular magnetic write head according to claim 5, wherein both the main magnetic pole layer and the nonmagnetic layer have a tensile stress.

7. The perpendicular magnetic write head according to claim 5, wherein the nonmagnetic layer is formed by ALD (atomic layer deposition) method.

8. The perpendicular magnetic write head according to claim 5, wherein the nonmagnetic layer is made of Aluminum Oxide ($AlO_x$) or Aluminum Nitride (AlN).

9. A magnetic write system comprising:
a write medium; and
a perpendicular magnetic write head, the perpendicular magnetic write head including:
a main magnetic pole layer leading magnetic flux to the write medium, and the main magnetic pole layer having an internal stress of a specified direction;
an auxiliary magnetic pole layer disposed on a trailing side of the main magnetic pole layer, the auxiliary magnetic pole layer being recessed from the main magnetic pole layer;
a nonmagnetic layer disposed in a layer same as the auxiliary magnetic pole layer and in front of the auxiliary magnetic pole layer, the nonmagnetic layer having an internal stress of a direction same as that of the main magnetic pole layer; and
a write shield layer disposed in a layer same as the auxiliary magnetic pole layer and in front of the auxiliary magnetic pole layer, the write shield layer being separated from the main magnetic pole layer with a gap layer in between, wherein
the nonmagnetic layer is arranged to fill up a space between the auxiliary magnetic pole layer and the write shield layer.

10. The magnetic write system according to claim 9, wherein the write medium includes a magnetization layer and a soft magnetic layer in this order from a side close to the perpendicular magnetic write head.

11. A magnetic write system comprising:
a write medium; and
a perpendicular magnetic write head, the perpendicular magnetic write head including:
a main magnetic pole layer leading magnetic flux to the write medium, and the main magnetic pole layer having an internal stress of a specified direction;
an auxiliary magnetic pole layer disposed on a leading side of the main magnetic pole layer, the auxiliary magnetic pole layer being recessed from the main magnetic pole layer;
a nonmagnetic layer disposed in a layer same as the auxiliary magnetic pole layer and in front of the auxiliary magnetic pole layer, the nonmagnetic layer having an internal stress of a direction same as that of the main magnetic pole layer;
a write shield layer disposed on the trailing side of the main magnetic pole layer in an area close to an airbearing surface, the write shield layer being separated from the main magnetic pole layer with a gap layer in between; and
another nonmagnetic layer disposed in a layer same as the write shield layer at the back of the write shield layer, the another nonmagnetic layer having an internal stress of a direction same as that of the main magnetic pole layer.

12. The magnetic write system according to claim 11, wherein the write medium includes a magnetization layer and a soft magnetic layer in this order from a side close to the perpendicular magnetic write head.

* * * * *